(12) United States Patent
Shih et al.

(10) Patent No.: US 11,564,262 B2
(45) Date of Patent: Jan. 24, 2023

(54) METHOD AND APPARATUS FOR DETERMINING TO USE COVERAGE ENHANCEMENT IN RANDOM ACCESS PROCEDURE IN A WIRELESS COMMUNICATION SYSTEM

(71) Applicant: ASUSTek Computer Inc., Taipei (TW)

(72) Inventors: Tun-Huai Shih, Taipei (TW); Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/522,092

(22) Filed: Nov. 9, 2021

(65) Prior Publication Data

US 2022/0150986 A1 May 12, 2022

Related U.S. Application Data

(60) Provisional application No. 63/111,833, filed on Nov. 10, 2020.

(51) Int. Cl.
| | | |
|---|---|---|
| *H04W 74/08* | (2009.01) | |
| *H04W 74/00* | (2009.01) | |
| *H04W 72/08* | (2009.01) | |
| *H04W 72/02* | (2009.01) | |
| *H04W 72/04* | (2009.01) | |

(52) U.S. Cl.
CPC ....... *H04W 74/0841* (2013.01); *H04W 72/02* (2013.01); *H04W 72/0453* (2013.01); *H04W 72/085* (2013.01); *H04W 74/004* (2013.01); *H04W 74/0866* (2013.01)

(58) Field of Classification Search
CPC ............. H04W 72/02; H04W 72/0453; H04W 72/085; H04W 74/004; H04W 74/0841; H04W 74/0866
See application file for complete search history.

(56) References Cited

U.S. PATENT DOCUMENTS

| | | | |
|---|---|---|---|
| 11,259,331 B2 * | 2/2022 | Jeon | H04W 74/006 |
| 2019/0305899 A1 * | 10/2019 | Rico Alvarino | H04L 1/0047 |
| 2020/0100297 A1 | 3/2020 | Agiwal et al. | |
| 2021/0250989 A1 * | 8/2021 | Chin | H04W 72/1284 |
| 2021/0360660 A1 * | 11/2021 | Cozzo | H04W 72/0453 |

FOREIGN PATENT DOCUMENTS

| | | | | |
|---|---|---|---|---|
| WO | WO-2019193420 A1 * | 10/2019 | | H04W 52/08 |
| WO | 20200160053 A1 | 8/2020 | | |
| WO | 2021029803 A1 | 2/2021 | | |

* cited by examiner

*Primary Examiner* — Rhonda L Murphy
(74) *Attorney, Agent, or Firm* — Cooper Legal Group LLC

(57) ABSTRACT

A method and apparatus are disclosed. In an example from the perspective of a User Equipment (UE), the UE initiates a Random Access (RA) procedure. The UE selects, from multiple carriers, a carrier for the RA procedure based on a measured Reference Signal Received Power (RSRP). The UE determines, based on the measured RSRP, whether or not to use a Physical Random Access Channel (PRACH) resource, associated with Message 3 (Msg3) repetition, for Message 1 (Msg1) transmission of the RA procedure, wherein the determination is performed after the selecting the carrier.

20 Claims, 6 Drawing Sheets

METHOD AND APPARATUS FOR DETERMINING TO USE COVERAGE ENHANCEMENT IN RANDOM ACCESS PROCEDURE IN A WIRELESS COMMUNICATION SYSTEM

CROSS-REFERENCE TO RELATED APPLICATIONS

The present Application claims the benefit of U.S. Provisional Patent Application Ser. No. 63/111,833 filed on Nov. 10, 2020, the entire disclosure of which is incorporated herein in its entirety by reference.

FIELD

This disclosure generally relates to wireless communication networks, and more particularly, to a method and apparatus for determining to use coverage enhancement in a Random Access (RA) procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE initiates a Random Access (RA) procedure. The UE selects, from multiple carriers, a carrier for the RA procedure based on a measured Reference Signal Received Power (RSRP). The UE determines, based on the measured RSRP, whether or not to use a Physical Random Access Channel (PRACH) resource, associated with Message 3 (Msg3) repetition, for Message 1 (Msg1) transmission of the RA procedure, wherein the determination is performed after the selecting the carrier.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-200861, "Revised SID on Study on NR coverage enhancements"; 3GPP TS 38.321 V16.2.1, "NR, MAC protocol specification". The standards and documents listed above are hereby expressly incorporated by reference in their entirety.

Figure 1:
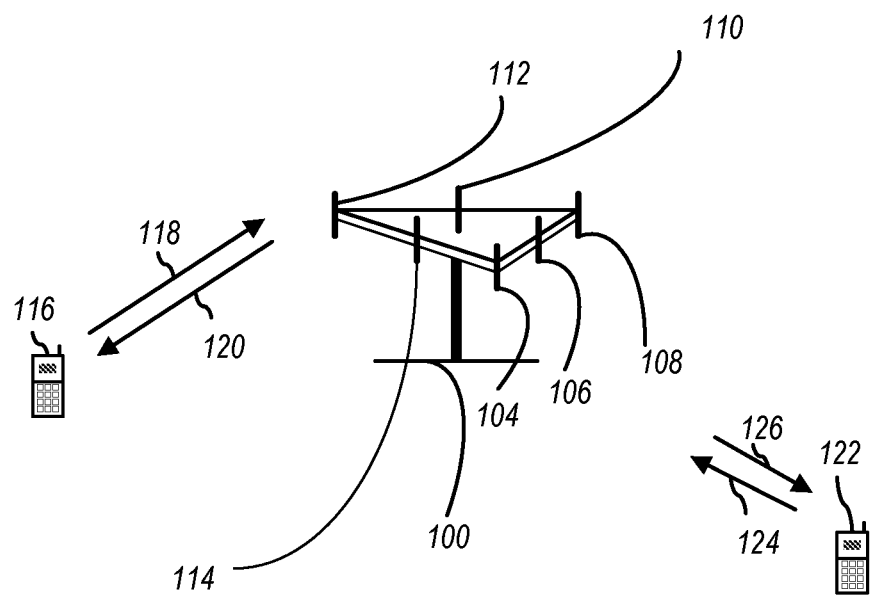
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
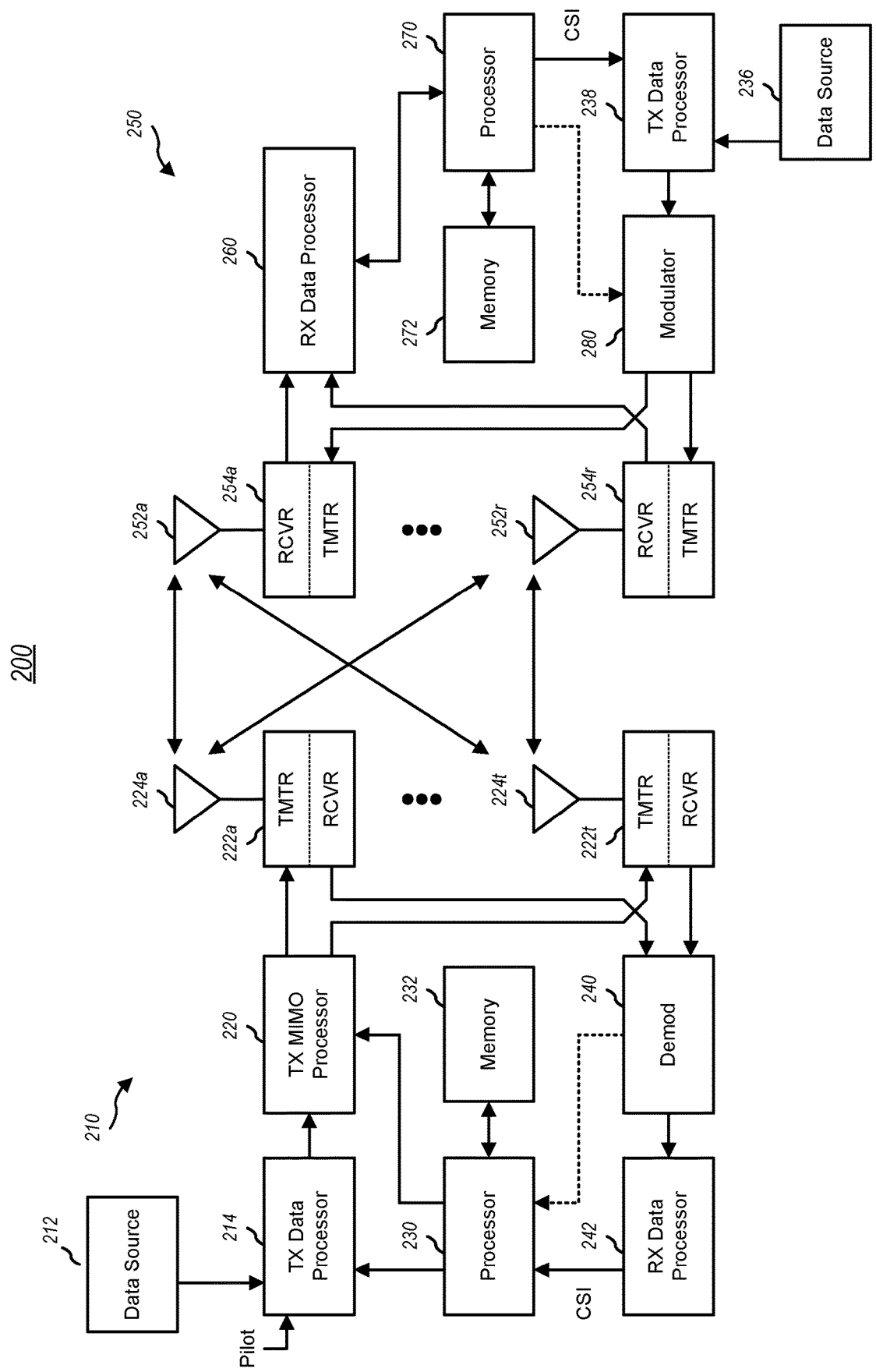
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
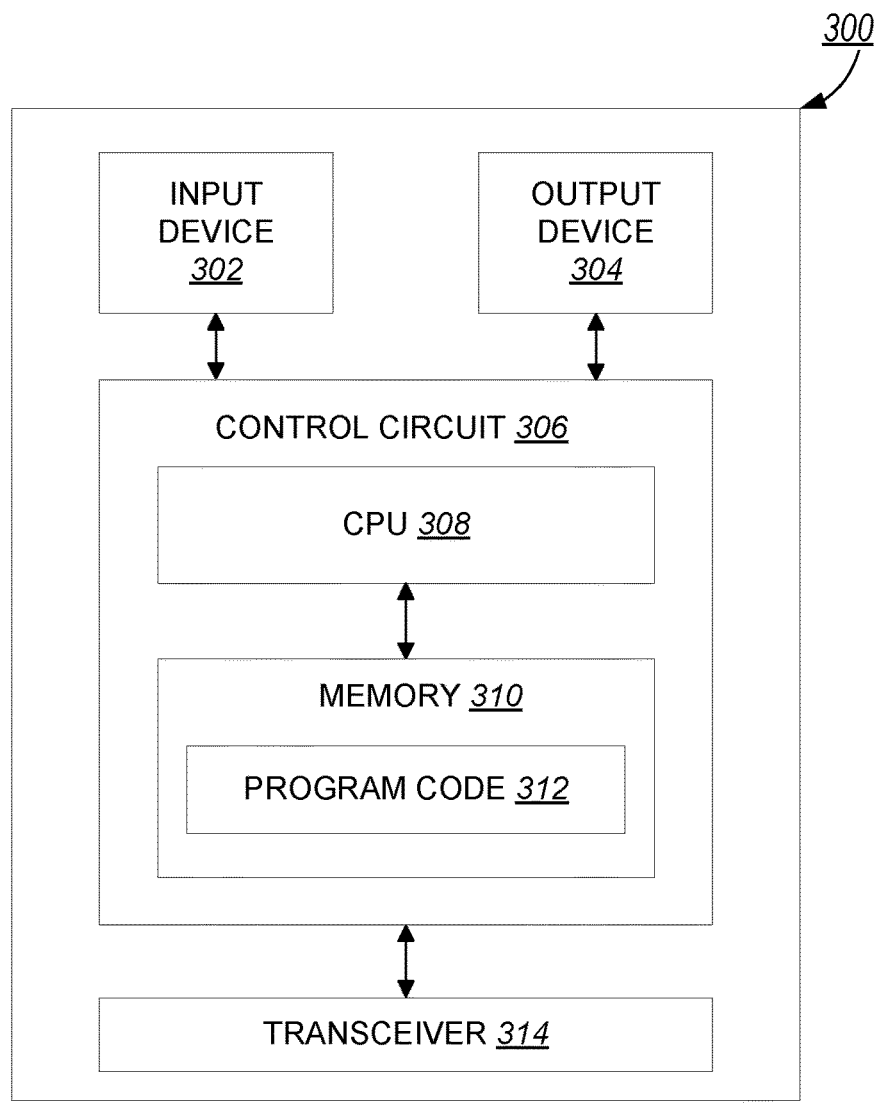
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
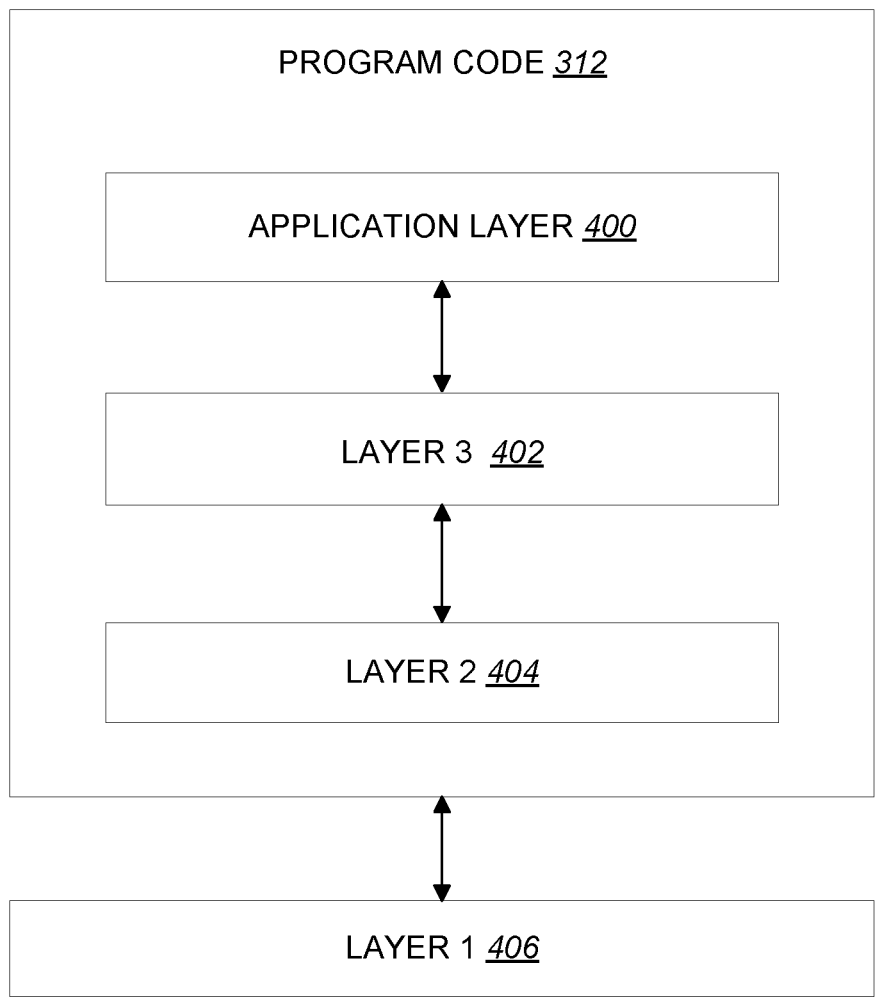
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Some texts related to NR coverage enhancements are quoted below from RP-200861:

3 Justification

Coverage is one of the key factors that an operator considers when commercializing cellular communication networks due to its direct impact on service quality as well as CAPEX and OPEX. Despite the importance of coverage on the success of NR commercialization, a thorough coverage evaluation and a comparison with legacy RATs considering all NR specification details have not been done up to now.

Compared to LTE, NR is designed to operate at much higher frequencies such as 28 GHz or 39 GHz in FR2. Furthermore, many countries are making available more spectrums on FR1, such as 3.5 GHz, which is typically in higher frequencies than for LTE or 3G. Due to the higher frequencies, it is inevitable that the wireless channel will be subject to higher path-loss making it more challenging to maintain an adequate quality of service that is at least equal to that of legacy RATs. One key mobile application of particular importance is voice service for which a typical subscriber will always expect a ubiquitous coverage wherever s/he is.

For FR1, NR can be deployed either in newly allocated spectrums, such as 3.5 GHz, or in a spectrum re-farmed from a legacy network, e.g., 3G and 4G. In either case, coverage will be a critical issue considering the fact that these spectrums will most likely handle key mobile services such as voice and low-rate data services. For FR2, coverage was not thoroughly evaluated during the self-evaluation campaign towards IMT-2020 submission and not considered in Rel-16 enhancements. In these regards, a thorough understanding of NR coverage performance is needed while taking into account the support of latest NR specification.

In RAN #84, NR coverage enhancement was identified as one RAN work area for Rel-17. During Phase 1 email discussion, 41 companies including 18 operators shared their views on scenarios, services and channels for coverage enhancement. During Phase 2 email discussion, 29 companies including 8 operators provided further views.

For FR1: Urban scenario (outdoor gNB serving indoor UEs), and rural scenario (including extreme long distance rural scenario, e.g. ISD=30 km), should be taken into account for coverage enhancement. VoIP and eMBB service should be taken into account for coverage enhancement. Both DL and UL should be taken into account for coverage enhancement. The coverage enhancement for UL (including PUSCH and PUCCH) should be prioritized. The target data rates were identified:

Urban scenario: DL 10 Mbps, UL 1 Mbps
Rural scenario: DL 1 Mbps, UL 100 kbps

For FR2: Indoor scenario (indoor gNB serving indoor UEs) and urban/suburban (including outdoor gNB serving outdoor UEs and outdoor gNB serving indoor UEs) scenario should be taken into account for coverage enhancement. eMBB is considered for coverage enhancement, and VoIP as second priority. Both DL and UL should be taken into account for coverage enhancement. And which channels should be considered depends on evaluation results. The target data rates were identified.

Indoor scenario: DL 25 Mbps, UL 5 Mbps
Urban scenario: DL [25 Mbps], UL [5 Mbps]
Suburban scenario: DL [1 Mbps], UL [50 kbps]

4 Objective 4.1 Objective of SI or Core Part WI or Testing Part WI

The objective of this study item is to study potential coverage enhancement solutions for specific scenarios for both FR1 and FR2. The detailed objectives are as follows.

The target scenarios and services include
Urban (outdoor gNB serving indoor UEs) scenario, and rural scenario (including extreme long distance rural scenario) for FR1
Indoor scenario (indoor gNB serving indoor UEs), and urban/suburban scenario (including outdoor gNB serving outdoor UEs and outdoor gNB serving indoor UEs) for FR2.
TDD and FDD for FR1.
VoIP and eMBB service for FR1.
eMBB service as first priority and VoIP as second priority for FR2.
LPWA services and scenarios are not included.

Identify baseline coverage performance for both DL and UL for the above scenarios and services based on link-level simulation
UL channels (including PUSCH and PUCCH) are prioritized for FR1.
Both DL and UL channels for FR2.

Identify the performance target for coverage enhancement, and study the potential solutions for coverage enhancements for the above scenarios and services
The target channels include at least PUSCH/PUCCH
Study enhanced solutions, e.g., time domain/frequency domain/DM-RS enhancement (including DM-RS-less transmissions)
Study the additional enhanced solutions for FR2 if any
Evaluate the performance of the potential solutions based on link level simulation.

Some texts related to NR Random Access (RA) procedure are quoted below from NR Medium Access Control (MAC) specification of 3GPP TS 38.321 V16.2.1:

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

[ . . . ]

RRC configures the following parameters for the Random Access procedure:

prach-Configurationindex: the available set of PRACH occasions for the transmission of the Random Access Preamble for Msg1. These are also applicable to the MSGA PRACH if the PRACH occasions are shared between 2-step and 4-step RA types;

prach-ConfigurationPeriodScaling-IAB: the scaling factor defined in TS 38.211 [8] and applicable to IAB-MTs, extending the periodicity of the PRACH occasions baseline configuration indicated by prach-Configurationindex;

prach-ConfigurationFrameOffset-IAB: the frame offset defined in TS 38.211 [8] and applicable to IAB-MTs, altering the ROs frame defined in the baseline configuration indicated by prach-Configurationindex;

prach-ConfigurationSOffset-IAB: the subframe/slot offset defined in TS 38.211 [8] and applicable to IAB-MTs, altering the ROs subframe or slot defined in the baseline configuration indicated by prach-ConfigurationIndex;

msgA-prach-ConfigurationIndex: the available set of PRACH occasions for the transmission of the Random Access Preamble for MSGA in 2-step RA type;

preambleReceivedTargetPower: initial Random Access Preamble power for 4-step RA type;

msgA-PreambleReceivedTargetPower: initial Random Access Preamble power for 2-step RA type;

rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecoveryConfig IE;

msgA-RSRP-ThresholdSSB: an RSRP threshold for the selection of the SSB for 2-step RA type;

rsrp-ThresholdSSB-SUL: an RSRP threshold for the selection between the NUL carrier and the SUL carrier;

msgA-RSRP-Threshold: an RSRP threshold for selection between 2-step RA type and 4-step RA type when both 2-step and 4-step RA type Random Access Resources are configured in the UL BWP;

msgA-TransMax: The maximum number of MSGA transmissions when both 4-step and 2-step RA type Random Access Resources are configured;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

msgA-PreamblePowerRampingStep: the power ramping factor for MSGA preamble;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

msgA-SSB-SharedRO-MaskIndex: Indicates the subset of 4-step RA type PRACH occasions shared with 2-step RA type PRACH occasions for each SSB. If 2-step RA type PRACH occasions are shared with 4-step RA type PRACH occasions and msgA-SSB-SharedRO-MaskIndex is not configured, then all 4-step RA type PRACH occasions are available for 2-step RA type (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion for 4-step RA type and the number of contention-based Random Access Preambles mapped to each SSB;

msgA-CB-PreamblesPerSSB-PerSharedRO: defines the number of contention-based Random Access Preambles for 2-step RA type mapped to each SSB when the PRACH occasions are shared between 2-step and 4-step RA types;

msgA-SSB-PerRACH-OccasionAndCB-PreamblesPerSSB: defines the number of SSBs mapped to each PRACH occasion for 2-step RA type and the number of contention-based Random Access Preambles mapped to each SSB;

msgA-PUSCH-ResourceGroupA: defines MSGA PUSCH resources that the UE shall use when performing MSGA transmission using Random Access Preambles group A;

msgA-PUSCH-ResourceGroupB: defines MSGA PUSCH resources that the UE shall use when performing MSGA transmission using Random Access Preambles group B;

msgA-PUSCH-resource-Index: identifies the index of the PUSCH resource used for MSGA in case of contention-free Random Access with 2-step RA type;

if groupBconfigured is configured, then Random Access Preambles group B is configured for 4-step RA type.

Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

[ . . . ]

the set of Random Access Preambles and/or PRACH occasions for SI request, if any;

the set of Random Access Preambles and/or PRACH occasions for beam failure recovery request, if any;

the set of Random Access Preambles and/or PRACH occasions for reconfiguration with sync, if any;

ra-ResponseWindow: the time window to monitor RA response(s) (SpCell only);

ra-ContentionResolutionTimer: the Contention Resolution Timer (SpCell only);

msgB-ResponseWindow: the time window to monitor RA response(s) for 2-step RA type (SpCell only).

[ . . . ]

When the Random Access procedure is initiated on a Serving Cell, the MAC entity shall:

1> flush the Msg3 buffer;
1> flush the MSGA buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> set POWER_OFFSET_2STEP_RA to 0 dB;
1> if the carrier to use for the Random Access procedure is explicitly signalled:
  2> select the signalled carrier for performing Random Access procedure;
  2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in TS 38.331 [5]; and
1> if the RSRP of the downlink pathloss reference is less than rsrp-ThresholdSSB-SUL:
  2> select the SUL carrier for performing Random Access procedure;
  2> set the PCMAX to $P_{CMAX,f,c}$ of the SUL carrier.
1> else:
  2> select the NUL carrier for performing Random Access procedure;
  2> set the PCMAX to $P_{CMAX,f,c}$ of the NUL carrier.
1> perform the BWP operation as specified in clause 5.15;
1> if the Random Access procedure is initiated by PDCCH order and if the ra-PreambleIndex explicitly provided by PDCCH is not 0b000000; or
1> if the Random Access procedure was initiated for SI request (as specified in TS 38.331 [5]) and the Random Access Resources for SI request have been explicitly provided by RRC; or 1> if the Random Access procedure was initiated for SpCell beam failure recovery (as specified in clause 5.17) and if the contention-free Random Access Resources for beam failure recovery request for 4-step RA type have been explicitly provided by RRC for the BWP selected for Random Access procedure; or
1> if the Random Access procedure was initiated for reconfiguration with sync and if the contention-free Random Access Resources for 4-step RA type have been explicitly provided in rach-ConfigDedicated for the BWP selected for Random Access procedure:
   2> set the RA_TYPE to 4-stepRA.
1> else if the BWP selected for Random Access procedure is configured with both 2-step and 4-step RA type Random Access Resources and the RSRP of the downlink pathloss reference is above msgA-RSRP-Threshold; or
1> if the BWP selected for Random Access procedure is only configured with 2-step RA type Random Access resources (i.e. no 4-step RACH RA type resources configured); or
1> if the Random Access procedure was initiated for reconfiguration with sync and if the contention-free Random Access Resources for 2-step RA type have been explicitly provided in rach-ConfigDedicated for the BWP selected for Random Access procedure:
   2> set the RA_TYPE to 2-stepRA.
1> else:
   2> set the RA_TYPE to 4-stepRA.
1> perform initialization of variables specific to Random Access type as specified in clause 5.1.1a;
1> if RA_TYPE is set to 2-stepRA:
   2> perform the Random Access Resource selection procedure for 2-step RA type (see clause 5.1.2a).
1> else:
   2> perform the Random Access Resource selection procedure (see clause 5.1.2).

5.1.2 Random Access Resource Selection

If the selected RA_TYPE is set to 4-stepRA, the MAC entity shall:

1> if the Random Access procedure was initiated for SpCell beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
     3> set the PREAMBLE_INDEX to a ra-PreambleIndex corresponding to the SSB in candidateBeamRSList which is quasi-colocated with the selected CSI-RS as specified in TS 38.214 [7].
   2> else:
     3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
1> else (i.e. for the contention-based Random Access preamble selection):
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> if the RA_TYPE is switched from 2-stepRA to 4-stepRA:
     3> if a Random Access Preambles group was selected during the current Random Access procedure:
       4> select the same group of Random Access Preambles as was selected for the 2-step RA type.
     3> else:
       4> if Random Access Preambles group B is configured; and
       4> if the transport block size of the MSGA payload configured in the rach-ConfigDedicated corresponds to the transport block size of the MSGA payload associated with Random Access Preambles group B:
- 5> select the Random Access Preambles group B.
- 4> else:
  - 5> select the Random Access Preambles group A.
- 2> else if Msg3 buffer is empty:
  - 3> if Random Access Preambles group B is configured:
    - 4> if the potential Msg3 size (UL data available for transmission plus MAC subheader and, where required, MAC CEs) is greater than ra-Msg3SizeGroupA and the pathloss is less than PCMAX (of the Serving Cell performing the Random Access Procedure)—preambleReceivedTargetPower-msg3-DeltaPreamble-messagePowerOffsetGroupB; Or
    - 4> if the Random Access procedure was initiated for the CCCH logical channel and the CCCH SDU size plus MAC subheader is greater than ra-Msg3SizeGroupA:
      - 5> select the Random Access Preambles group B.
    - 4> else:
      - 5> select the Random Access Preambles group A.
  - 3> else:
    - 4> select the Random Access Preambles group A.
- 2> else (i.e. Msg3 is being retransmitted):
  - 3> select the same group of Random Access Preambles as was used for the Random Access Preamble transmission attempt corresponding to the first transmission of Msg3.
- 2> select a Random Access Preamble randomly with equal probability from the Random Access Preambles associated with the selected SSB and the selected Random Access Preambles group;
- 2> set the PREAMBLE_INDEX to the selected Random Access Preamble.

1> if the Random Access procedure was initiated for SI request (as specified in TS 38.331 [5]); and
1> if ra-AssociationPeriodIndex and si-RequestPeriod are configured:
- 2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).

1> else if an SSB is selected above:
- 2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).

1> else if a CSI-RS is selected above:
- 2> if there is no contention-free Random Access Resource associated with the selected CSI-RS:
  - 3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
- 2> else:
  - 3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1> perform the Random Access Preamble transmission procedure (see clause 5.1.3).

NOTE 1: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.2a Random Access Resource Selection for 2-Step RA Type

If the selected RA_TYPE is set to 2-stepRA, the MAC entity shall:
- 1> if the contention-free 2-step RA type Resources associated with SSBs have been explicitly provided in rach-ConfigDedicated and at least one SSB with SS-RSRP above msgA-RSRP-ThresholdSSB amongst the associated SSBs is available:
  - 2> select an SSB with SS-RSRP above msgA-RSRP-ThresholdSSB amongst the associated SSBs;
  - 2> set the PREAMBLE_INDEX to a ra-PreambleIndex corresponding to the selected SSB.
- 1> else (i.e. for the contention-based Random Access Preamble selection):
  - 2> if at least one of the SSBs with SS-RSRP above msgA-RSRP-ThresholdSSB is available:
    - 3> select an SSB with SS-RSRP above msgA-RSRP-ThresholdSSB.
  - 2> else:
    - 3> select any SSB.
  - 2> if contention-free Random Access Resources for 2-step RA type have not been configured and if Random Access Preambles group has not yet been selected during the current Random Access procedure:
    - 3> if Random Access Preambles group B for 2-step RA type is configured:
      - 4> if the potential MSGA payload size (UL data available for transmission plus MAC subheader and, where required, MAC CEs) is greater than the ra-MsgA-SizeGroupA and the pathloss is less than PCMAX (of the Serving Cell performing the Random Access Procedure)-msgA-PreambleReceivedTargetPower-msgA-DeltaPreamble-msgA-messagePowerOffsetGroupB; or 4> if the Random Access procedure was initiated for the CCCH logical channel and the CCCH SDU size plus MAC subheader is greater than ra-MsgA-SizeGroupA:

5> select the Random Access Preambles group B.

4> else:

5> select the Random Access Preambles group A.

3> else:

4> select the Random Access Preambles group A.

2> else if contention-free Random Access Resources for 2-step RA type have been configured and if Random Access Preambles group has not yet been selected during the current Random Access procedure:

3> if Random Access Preambles group B for 2-step RA type is configured; and

3> if the transport block size of the MSGA payload configured in the rach-ConfigDedicated corresponds to the transport block size of the MSGA payload associated with Random Access Preambles group B:

4> select the Random Access Preambles group B.

3> else:

4> select the Random Access Preambles group A.

2> else (i.e. Random Access preambles group has been selected during the current Random Access procedure):

3> select the same group of Random Access Preambles as was used for the Random Access Preamble transmission attempt corresponding to the earlier transmission of MSGA.

2> select a Random Access Preamble randomly with equal probability from the 2-step RA type Random Access Preambles associated with the selected SSB and the selected Random Access Preambles group;

2> set the PREAMBLE_INDEX to the selected Random Access Preamble;

1> determine the next available PRACH occasion from the PRACH occasions corresponding to the selected SSB permitted by the restrictions given by the msgA-SSB-SharedRO-MaskIndex if configured and ra-ssb-OccasionMaskIndex if configured (the MAC entity shall select a PRACH occasion randomly with equal probability among the consecutive PRACH occasions allocated for 2-step RA type according to clause 8.1 of TS 38.213 [6], corresponding to the selected SSB; the MAC entity may take into account the possible occurrence of measurement gaps when determining the next available PRACH occasion corresponding to the selected SSB);

1> if the Random Access Preamble was not selected by the MAC entity among the contention-based Random Access Preamble(s):

2> select a PUSCH occasion from the PUSCH occasions configured in msgA-CFRA-PUSCH corresponding to the PRACH slot of the selected PRACH occasion, according to msgA-PUSCH-resource-Index corresponding to the selected SSB;

2> determine the UL grant and the associated HARQ information for the MSGA payload in the selected PUSCH occasion;

2> deliver the UL grant and the associated HARQ information to the HARQ entity.

1> else:

2> select a PUSCH occasion corresponding to the selected preamble and PRACH occasion according to clause 8.1A of TS 38.213 [6];

2> determine the UL grant for the MSGA payload according to the PUSCH configuration associated with the selected Random Access Preambles group and determine the associated HARQ information;

2> if the selected preamble and PRACH occasion is mapped to a valid PUSCH occasion as specified in clause 8.1A of TS 38.213 [6]:

3> deliver the UL grant and the associated HARQ information to the HARQ entity.

1> perform the MSGA transmission procedure (see clause 5.1.3a).

NOTE: To determine if there is an SSB with SS-RSRP above msgA-RSRP-ThresholdSSB, the UE uses the latest unfiltered L1-RSRP measurement.

5.1.3 Random Access Preamble Transmission

The MAC entity shall, for each Random Access Preamble:

[ . . . ]

1> instruct the physical layer to transmit the Random Access Preamble using the selected PRACH occasion, corresponding RA-RNTI (if available), PREAMBLE_INDEX, and PREAMBLE_RECEIVED_TARGET POWER.

[ . . . ]

5.1.3a MSGA Transmission

The MAC entity shall, for each MSGA:

[ . . . ]

1> if this is the first MSGA transmission within this Random Access procedure:

2> if the transmission is not being made for the CCCH logical channel:

3> indicate to the Multiplexing and assembly entity to include a C-RNTI MAC CE in the subsequent uplink transmission.

2> if the Random Access procedure was initiated for SpCell beam failure recovery:

3> indicate to the Multiplexing and assembly entity to include a BFR MAC CE or a Truncated BFR MAC CE in the subsequent uplink transmission.

2> obtain the MAC PDU to transmit from the Multiplexing and assembly entity according to the HARQ information determined for the MSGA payload (see clause 5.1.2a) and store it in the MSGA buffer.

1> compute the MSGB-RNTI associated with the PRACH occasion in which the Random Access Preamble is transmitted;

1> instruct the physical layer to transmit the MSGA using the selected PRACH occasion and the associated PUSCH resource of MSGA (if the selected preamble and PRACH occasion is mapped to a valid PUSCH occasion), using the corresponding RA-RNTI, MSGB-RNTI, PREAMBLE_INDEX, PREAMBLE_RECEIVED_TARGET_POWER, msgA-PreambleReceivedTargetPower, and the amount of power ramping applied to the latest MSGA preamble transmission (i.e. (PREAMBLE_POWER_RAMPING_COUNTER-1)× PREAMBLE_POWER_RAMPING_STEP);

[ . . . ]

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:
  2> start the ra-Response Window configured in BeamFailureRecoveryConfig at the first PDCCH occasion as specified in TS 38.213 [6] from the end of the Random Access Preamble transmission;
  2> monitor for a PDCCH transmission on the search space indicated by recoverySearchSpaceId of the SpCell identified by the C-RNTI while ra-ResponseWindow is running
1> else:
  2> start the ra-Response Window configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-ResponseWindow is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a valid (as specified in TS 38.213 [6]) downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see clause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see clause 5.2);
        5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
        5> if the Random Access procedure for an SCell is performed on uplink carrier where pusch-Config is not configured:
          6> ignore the received UL grant.
        5> else:
          6> process the received UL grant value and indicate it to the lower layers.
    4> if the Random Access Preamble was not selected by the MAC entity among the contention-based Random Access Preamble(s):
      5> consider the Random Access procedure successfully completed.
    4> else:
      5> set the TEMPORARY C-RNTI to the value received in the Random Access Response;
      5> if this is the first successfully received Random Access Response within this Random Access procedure:
        6> if the transmission is not being made for the CCCH logical channel:
          7> indicate to the Multiplexing and assembly entity to include a C-RNTI MAC CE in the subsequent uplink transmission.
        6> if the Random Access procedure was initiated for SpCell beam failure recovery:
          7> indicate to the Multiplexing and assembly entity to include a BFR MAC CE or a Truncated BFR MAC CE in the subsequent uplink transmission.
        6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the UE behavior is not defined.

1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
1> if ra-Response Window configured in RACH-ConfigCommon expires, and if the Random Access Response containing Random Access Preamble identifiers that matches the transmitted PREAMBLE INDEX has not been received:
  2> consider the Random Access Response reception not successful;
  2> increment PREAMBLE_TRANSMISSION_COUNTER by 1;
  2> if PREAMBLE_TRANSMISSION_COUNTER=preambleTransMax+1:
    3> if the Random Access Preamble is transmitted on the SpCell:
      4> indicate a Random Access problem to upper layers;
      4> if this Random Access procedure was triggered for SI request:
        5> consider the Random Access procedure unsuccessfully completed.
    3> else if the Random Access Preamble is transmitted on an SCell:

4> consider the Random Access procedure unsuccessfully completed.
2> if the Random Access procedure is not completed:
3> select a random backoff time according to a uniform distribution between 0 and the PRE-AMBLE_BACKOFF;
3> if the criteria (as defined in clause 5.1.2) to select contention-free Random Access Resources is met during the backoff time:
4> perform the Random Access Resource selection procedure (see clause 5.1.2);
3> else if the Random Access procedure for an SCell is performed on uplink carrier where pusch-Config is not configured:
4> delay the subsequent Random Access transmission until the Random Access Procedure is triggered by a PDCCH order with the same ra-PreambleIndex, ra-ssb-OccasionMaskIndex, and UL/SUL indicator TS 38.212 [9].
3> else:
4> perform the Random Access Resource selection procedure (see clause 5.1.2) after the backoff time.
[ . . . ]
5.1.4a MSGB Reception and Contention Resolution for 2-Step RA Type Once the MSGA preamble is transmitted, regardless of the possible occurrence of a measurement gap, the MAC entity shall:
1> start the msgB-ResponseWindow at the PDCCH occasion as specified in TS 38.213 [6], clause 8.2A;
1> monitor the PDCCH of the SpCell for a Random Access Response identified by MSGB-RNTI while the msgB-ResponseWindow is running;
1> if C-RNTI MAC CE was included in the MSGA:
2> monitor the PDCCH of the SpCell for Random Access Response identified by the C-RNTI while the msgB-ResponseWindow is running
1> if notification of a reception of a PDCCH transmission of the SpCell is received from lower layers:
2> if the C-RNTI MAC CE was included in MSGA:
3> if the Random Access procedure was initiated for SpCell beam failure recovery (as specified in clause 5.17) and the PDCCH transmission is addressed to the C-RNTI:
4> consider this Random Access Response reception successful;
4> stop the msgB-ResponseWindow;
4> consider this Random Access procedure successfully completed.
3> else if the timeAlignmentTimer associated with the PTAG is running:
4> if the PDCCH transmission is addressed to the C-RNTI and contains a UL grant for a new transmission:
5> consider this Random Access Response reception successful;
5> stop the msgB-ResponseWindow;
5> consider this Random Access procedure successfully completed.
3> else:
4> if a downlink assignment has been received on the PDCCH for the C-RNTI and the received TB is successfully decoded:
5> if the MAC PDU contains the Absolute Timing Advance Command MAC CE:
6> process the received Timing Advance Command (see clause 5.2);
6> consider this Random Access Response reception successful;
6> stop the msgB-ResponseWindow;
6> consider this Random Access procedure successfully completed and finish the disassembly and demultiplexing of the MAC PDU.
2> if a valid (as specified in TS 38.213 [6]) downlink assignment has been received on the PDCCH for the MSGB-RNTI and the received TB is successfully decoded:
3> if the MSGB contains a MAC subPDU with Backoff Indicator:
4> set the PREAMBLE_BACKOFF to value of the BI field of the MAC subPDU using Table 7.2-1, multiplied with SCALING_FACTOR_BI.
3> else:
4> set the PREAMBLE_BACKOFF to 0 ms.
3> if the MSGB contains a fallbackRAR MAC subPDU; and
3> if the Random Access Preamble identifier in the MAC subPDU matches the transmitted PREAMBLE_INDEX (see clause 5.1.3a):
4> consider this Random Access Response reception successful;
4> apply the following actions for the SpCell:
5> process the received Timing Advance Command (see clause 5.2);
5> indicate the msgA-PreambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
5> if the Random Access Preamble was not selected by the MAC entity among the contention-based Random Access Preamble(s):
6> consider the Random Access procedure successfully completed;
6> process the received UL grant value and indicate it to the lower layers.
5> else:
6> set the TEMPORARY C-RNTI to the value received in the Random Access Response;
6> if the Msg3 buffer is empty:
7> obtain the MAC PDU to transmit from the MSGA buffer and store it in the Msg3 buffer;
6> process the received UL grant value and indicate it to the lower layers and proceed with Msg3 transmission.
NOTE: If within a 2-step RA type procedure, an uplink grant provided in the fallback RAR has a different size than the MSGA payload, the UE behavior is not defined.
3> else if the MSGB contains a successRAR MAC subPDU; and
3> if the CCCH SDU was included in the MSGA and the UE Contention Resolution Identity in the MAC subPDU matches the CCCH SDU:
4> stop msgB-ResponseWindow;
4> if this Random Access procedure was initiated for SI request:
5> indicate the reception of an acknowledgement for SI request to upper layers.

4> else:
    5> set the C-RNTI to the value received in the successRAR;
    5> apply the following actions for the SpCell:
        6> process the received Timing Advance Command (see clause 5.2);
        6> indicate the msgA-PreambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP).
4> deliver the TPC, PUCCH resource Indicator, ChannelAccess-CPext (if indicated), and HARQ feedback Timing Indicator received in successRAR to lower layers.
4> consider this Random Access Response reception successful;
4> consider this Random Access procedure successfully completed;
4> finish the disassembly and demultiplexing of the MAC PDU.
1> if msgB-Response Window expires, and the Random Access Response Reception has not been considered as successful based on descriptions above:
    2> increment PREAMBLE_TRANSMISSION_COUNTER by 1;
    2> if PREAMBLE_TRANSMISSION_COUNTER=preambleTransMax+1:
        3> indicate a Random Access problem to upper layers;
        3> if this Random Access procedure was triggered for SI request:
            4> consider this Random Access procedure unsuccessfully completed.
    2> if the Random Access procedure is not completed:
        3> if msgA-TransMax is applied (see clause 5.1.1a) and PREAMBLE_TRANSMISSION_COUNTER=msgA-TransMax+1:
            4> set the RA_TYPE to 4-stepRA;
            4> perform initialization of variables specific to Random Access type as specified in clause 5.1.1a;
            4> if the Msg3 buffer is empty:
                5> obtain the MAC PDU to transmit from the MSGA buffer and store it in the Msg3 buffer;
            4> flush HARQ buffer used for the transmission of MAC PDU in the MSGA buffer;
            4> discard explicitly signalled contention-free 2-step RA type Random Access Resources, if any;
            4> perform the Random Access Resource selection procedure as specified in clause 5.1.2.
        3> else:
            4> select a random backoff time according to a uniform distribution between 0 and the PREAMBLE_BACKOFF;
            4> if the criteria (as defined in clause 5.1.2a) to select contention-free Random Access Resources is met during the backoff time:
                5> perform the Random Access Resource selection procedure for 2-step RA type Random Access (see clause 5.1.2a).
            4> else:
                5> perform the Random Access Resource selection procedure for 2-step RA type Random Access (see clause 5.1.2a) after the backoff time.

Upon receiving a fallbackRAR, the MAC entity may stop msgB-ResponseWindow once the Random Access Response reception is considered as successful.

5.1.5 Contention Resolution

Once Msg3 is transmitted the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
    2> if the C-RNTI MAC CE was included in Msg3:
        3> if the Random Access procedure was initiated for SpCell beam failure recovery (as specified in clause 5.17) and the PDCCH transmission is addressed to the C-RNTI; or
        3> if the Random Access procedure was initiated by a PDCCH order and the PDCCH transmission is addressed to the C-RNTI; or
        3> if the Random Access procedure was initiated by the MAC sublayer itself or by the RRC sublayer and the PDCCH transmission is addressed to the C-RNTI and contains a UL grant for a new transmission:
            4> consider this Contention Resolution successful;
            4> stop ra-ContentionResolutionTimer;
            4> discard the TEMPORARY C-RNTI;
            4> consider this Random Access procedure successfully completed.
    2> else if the CCCH SDU was included in Msg3 and the PDCCH transmission is addressed to its TEMPORARY C-RNTI:
        3> if the MAC PDU is successfully decoded:
            4> stop ra-ContentionResolutionTimer;
            4> if the MAC PDU contains a UE Contention Resolution Identity MAC CE; and
            4> if the UE Contention Resolution Identity in the MAC CE matches the CCCH SDU transmitted in Msg3:
                5> consider this Contention Resolution successful and finish the disassembly and demultiplexing of the MAC PDU;
                5> if this Random Access procedure was initiated for SI request:
                    6> indicate the reception of an acknowledgement for SI request to upper layers.
                5> else:
                    6> set the C-RNTI to the value of the TEMPORARY_C-RNTI;
                5> discard the TEMPORARY_C-RNTI;
                5> consider this Random Access procedure successfully completed.
            4> else:
                5> discard the TEMPORARY C-RNTI;
                5> consider this Contention Resolution not successful and discard the successfully decoded MAC PDU.

1> if ra-ContentionResolutionTimer expires:
   2> discard the TEMPORARY C-RNTI;
   2> consider the Contention Resolution not successful.
1> if the Contention Resolution is considered not successful:
   2> flush the HARQ buffer used for transmission of the MAC PDU in the Msg3 buffer;
   2> increment PREAMBLE_TRANSMISSION_COUNTER by 1;
   2> if PREAMBLE_TRANSMISSION_COUNTER= preambleTransMax+1:
      3> indicate a Random Access problem to upper layers.
      3> if this Random Access procedure was triggered for SI request:
         4> consider the Random Access procedure unsuccessfully completed.
   2> if the Random Access procedure is not completed:
      3> if the RA_TYPE is set to 4-stepRA:
         4> select a random backoff time according to a uniform distribution between 0 and the PREAMBLE_BACKOFF;
         4> if the criteria (as defined in clause 5.1.2) to select contention-free Random Access Resources is met during the backoff time:
            5> perform the Random Access Resource selection procedure (see clause 5.1.2);
         4> else:
            5> perform the Random Access Resource selection procedure (see clause 5.1.2) after the backoff time.
      3> else (i.e. the RA_TYPE is set to 2-stepRA):
         4> if msgA-TransMax is applied (see clause 5.1.1a) and PREAMBLE_TRANSMISSION_COUNTER=msgA-TransMax+1:
            5> set the RA_TYPE to 4-stepRA;
            5> perform initialization of variables specific to Random Access type as specified in clause 5.1.1a;
            5> flush HARQ buffer used for the transmission of MAC PDU in the MSGA buffer;
            5> discard explicitly signalled contention-free 2-step RA type Random Access Resources, if any;
            5> perform the Random Access Resource selection as specified in clause 5.1.2.
         4> else:
            5> select a random backoff time according to a uniform distribution between 0 and the PREAMBLE_BACKOFF;
            5> if the criteria (as defined in clause 5.1.2a) to select contention-free Random Access Resources is met during the backoff time:
               6> perform the Random Access Resource selection procedure for 2-step RA type as specified in clause 5.1.2a.
            5> else:
               6> perform the Random Access Resource selection for 2-step RA type procedure (see clause 5.1.2a) after the backoff time.

In order to enhance the coverage of an NR system, some mechanisms may be introduced. In some examples, according to the objectives listed in RP-200861, uplink (UL) channels (comprising Physical Uplink Shared Channel (PUSCH) and/or Physical Uplink Control Channel (PUCCH), for example) are prioritized for Frequency Range 1 (FR1). In other words, an objective of NR coverage enhancements is to improve UL coverage in FR1. A possible mechanism for enhancing the UL coverage is repetition (e.g., repetition of transmissions) in time domain. For example, the UE may transmit the same UL data multiple times in consecutive (or non-consecutive) slots, so as to increase a likelihood that the network side (e.g., a network to which the same UL data is transmitted) successfully decodes the same UL data. A number of repetitions (e.g., a number of times that the UE transmits the same UL data) may be controlled by the network (e.g., the network may control the number of repetitions through Radio Resource Control (RRC) configuration and/or an indication in Downlink Control Information (DCI)). In an example, based on a UL grant received from the network, the UE may perform a transmission on PUSCH with 4 repetitions. For example, the transmission may comprise an initial transmission of data on the PUSCH followed by 3 repetitions (e.g., the 4 repetitions may comprise the UE transmitting the data 4 times on the PUSCH). In another example, based on a UL grant received from the network, the UE may perform a transmission on PUSCH without repetitions. For example, the transmission may comprise a transmission of data on the PUSCH that is not followed by a repetition (e.g., the transmission may comprise the UE transmitting the data a single time on the PUSCH). Similar mechanisms associated with repetition (e.g., repetition of transmissions) and/or coverage enhancement are also used in LTE systems (e.g., coverage enhancement mode and/or level).

Random Access (RA) procedure is used for various purposes comprising initial access on a Cell. A coverage of an RA procedure may also be enhanced (e.g., coverage-enhanced RA procedure) so that more UEs are able to connect to a Cell (e.g., more UEs may be able to connect to a Cell using coverage-enhanced RA procedure than using non-coverage-enhanced RA procedure). Alternatively and/or additionally, compared to non-coverage-enhanced RA procedure, coverage-enhanced RA procedure may also reduce power consumption of UEs in poor radio condition by reducing a failure rate of Message 1 (Msg1) transmission and/or Message 3 (Msg3) transmission (e.g., the reduced power consumption and/or the reduced failure rate may be due to a reduced number of transmission attempts of Msg1 and/or Msg3 using coverage-enhanced RA procedure as compared to using non-coverage-enhanced RA procedure). In an example, during a RA procedure (e.g., a coverage-enhanced RA procedure) of a UE, a first counter (e.g., PREAMBLE_TRANSMISSION_COUNTER) is used to count a number of transmission attempts of Msg1 (e.g., the first counter may be incremented each time a transmission attempt of Msg1 is performed). When the first counter meets (e.g., reaches or exceeds) a threshold (e.g., a configurable threshold, such as preambleTransMax), the UE may indicate a RA problem to one or more upper layers (e.g., one or more upper layers of the UE, such as an RRC layer) and/or the UE may consider the RA procedure to be unsuccessfully completed. For example, the UE may indicate the RA problem to the one or more upper layers (and/or may consider the RA procedure to be unsuccessfully completed) in response to (and/or upon) the first counter meeting (e.g., reaching or exceeding) the threshold. Accordingly, performing the RA procedure as a coverage-enhanced procedure may increase a likelihood that the RA procedure is successfully completed, such as due to the reduced failure rate of Msg1 transmission and/or Msg3 transmission of the RA procedure.

For at least some transmissions associated with the UE in RRC_CONNECTED state (e.g., most transmissions of the UE when the UE is in RRC_CONNECTED state), the network may control whether or not coverage enhancement is required for (and/or to be implemented by) the UE (e.g., the network may control whether coverage enhancement is required for the UE based on one or more radio conditions between the UE and the network). However, in some examples, in a contention-based RA procedure, the network is not able to identify the UE until successful reception of a Msg3 of the contention-based RA procedure (e.g., the Msg3 may comprise a UE identity, such as a 5G-S-Temporary Mobile Subscriber Identity (5G-S-TMSI), where the network may not know the UE identity prior to successfully receiving the Msg3). It is thus unclear how the UE and/or the network can determine whether the UE should perform a legacy RA procedure or perform a coverage-enhanced RA procedure. Accordingly, the UE and/or the network may not be able to determine whether the UE should perform the legacy RA procedure or perform the coverage-enhanced RA procedure.

In the following, "legacy RA" refers to a RA procedure without coverage enhancement and "coverage-enhanced RA" refers to a RA procedure with coverage enhancement. The coverage enhancement of a RA procedure (e.g., a coverage-enhanced RA) may comprise one or more repetitions of Msg1 (e.g., one or more repetitions of a Msg1 transmission on Physical Random Access Channel (PRACH)). For example, a Msg1 transmission of a coverage-enhanced RA may comprise an initial transmission of Msg1 followed by one or more repetitions of Msg1 (e.g., the one or more repetitions may comprise the UE transmitting the Msg1 one or more times after the initial transmission of the Msg1). Alternatively and/or additionally, the coverage enhancement for the RA procedure may comprise one or more repetitions of Msg3 (e.g., one or more repetitions of a Msg3 transmission on PUSCH). For example, a Msg3 transmission of the coverage-enhanced RA may comprise an initial transmission of Msg3 followed by one or more repetitions of Msg3 (e.g., the one or more repetitions may comprise the UE transmitting the Msg3 one or more times after the initial transmission of the Msg3).

At least one of the following embodiments (e.g., a first embodiment, a second embodiment, a third embodiment, a fourth embodiment, a fifth embodiment and/or a sixth embodiment) can be used to solve (but are not limited to solving) one or more issues mentioned above (e.g., the UE and/or the network not being able to determine whether the UE should perform legacy RA or should perform coverage-enhanced RA).

In the first embodiment, upon (and/or in response to) initiation of a RA procedure, the UE determines whether to use legacy RA (e.g., use one or more PRACH resources for legacy RA) or to use coverage-enhanced RA (e.g., use one or more PRACH resources for coverage-enhanced RA) based on a measured RSRP of a downlink pathloss reference.

In an example, if the measured RSRP of the downlink pathloss reference is less than a first threshold, the UE uses coverage-enhanced RA (e.g., the UE uses one or more PRACH resources for coverage-enhanced RA and/or the UE performs the RA procedure as a coverage-enhanced RA).

Alternatively and/or additionally, if the measured RSRP of the downlink pathloss reference is not less than the first threshold, the UE uses legacy RA (e.g., the UE uses one or more PRACH resources for legacy RA and/or the UE performs the RA procedure as a legacy RA).

The first threshold may be provided by the network (e.g., the network may transmit an indication of the first threshold to the UE). The first threshold may be provided in System Information (e.g., System Information Block Type 1 (SIB1)). For example, the System Information may comprise an indication of the first threshold and/or may be transmitted to the UE. Alternatively and/or additionally, the first threshold may be provided in an RA-related configuration (e.g., RACH-ConfigCommon). For example, the RA-related configuration may comprise an indication of the first threshold and/or may be transmitted to the UE (e.g., the UE may be configured with the RA-related configuration). Alternatively and/or additionally, the first threshold may be an RSRP threshold (e.g., rsrp-ThresholdSSB-SUL) for selection between a normal uplink (NUL) carrier and a supplementary uplink (SUL) carrier (e.g., the RSRP threshold may be used for selection of a carrier from among the NUL carrier and the SUL carrier). Alternatively and/or additionally, the first threshold may be a threshold other than rsrp-ThresholdSSB-SUL. In some examples, the first threshold and the rsrp-ThresholdSSB-SUL may be used for a same type of UE (e.g., a Reduced Capability UE). Alternatively and/or additionally, the first threshold and the rsrp-ThresholdSSB-SUL may be provided in System Information for a same type of UE (e.g., a Reduced Capability UE).

In some examples, the UE may perform the determination (of whether to use legacy RA or to use coverage-enhanced RA) before selecting a UL carrier (e.g., the SUL carrier or the NUL carrier) for the RA procedure. Alternatively, the UE may perform the determination after selecting the UL carrier (e.g., the SUL carrier or the NUL carrier) for the RA procedure.

In some examples, the UE may perform the determination before determining an RA type (e.g., a type of RA procedure), such as 2-Step RA type or 4-Step RA type, for the RA procedure. Alternatively, the UE may perform the determination after determining the RA type (e.g., 2-Step RA type or 4-Step RA type) for the RA procedure.

In some examples, the UE may perform the determination at most once for each RA procedure. In other words, in some examples, once the determination is made, the UE does not perform a second determination, of whether to use legacy RA or to use coverage-enhanced RA, during the RA procedure (e.g., once the determination is made, the UE does not perform the determination again during the RA procedure). The UE may not perform a second determination of whether to use legacy RA or to use coverage-enhanced RA at a subsequent PRACH resource selection (e.g., a PRACH resource selection other than an initial PRACH resource selection performed upon and/or in response to initiation of the RA procedure).

For example, if the UE determines to use one or more PRACH resources (e.g., one or more RA preamble indices) for coverage-enhanced RA (e.g., for Msg3 repetition), the UE may keep using the one or more PRACH resources (and/or one or more RA preambles) for coverage-enhanced RA (e.g., for Msg3 repetition) during the RA procedure. For example, the UE may continue using the one or more PRACH resources for coverage-enhanced RA during the RA procedure even if, later on, the measured RSRP increases (e.g., improves) to over the first threshold during the RA procedure. The UE may not perform a second determination (e.g., a second determination of whether to use one or more PRACH resources for coverage-enhanced RA or to use one or more PRACH resources for legacy RA) to reselect one or more PRACH resources (and/or one or more RA preambles) that are not for coverage-enhanced RA (e.g., one or more PRACH resources and/or one or more RA preambles that are not for Msg3 repetition) during the RA procedure.

PRACH resources for coverage-enhanced RA and PRACH resources for legacy RA may be differentiated by PRACH occasion, time-frequency domain resource, and/or RA preamble index. For example, one or more PRACH occasions of one or more PRACH resources for coverage-enhanced RA may be different than one or more PRACH occasions of one or more PRACH resources for legacy RA. Alternatively and/or additionally, one or more time-frequency domain resources (e.g., one or more time-frequency domain resource locations) of the one or more PRACH resources for coverage-enhanced RA may be different than one or more time-frequency domain resources (e.g., one or more time-frequency domain resource locations) of the one or more PRACH resources for legacy RA. Alternatively and/or additionally, one or more RA preamble indices of the one or more PRACH resources for coverage-enhanced RA may be different than one or more RA preamble indices of the one or more PRACH resources for legacy RA. The UE uses the one or more PRACH resources for coverage-enhanced RA if the UE is performing a coverage-enhanced RA. The UE uses the one or more PRACH resources for legacy RA if the UE is performing a legacy RA.

In the second embodiment, upon (and/or in response to) selecting a Synchronization Signal (SS)/Physical Broadcast Channel (PBCH) Block (SSB) or a Channel State Information Reference Signal (CSI-RS) for Msg1 transmission (e.g., Msg1 transmission of a RA procedure), the UE determines whether to use legacy RA or to use coverage-enhanced RA based on a quality (e.g., a measured RSRP) of the selected SSB/CSI-RS. In the present disclosure, the term "SSB/CSI-RS" may refer to a SSB and/or a CSI-RS.

In some examples, during a RA procedure, the UE selects a beam based on a quality (e.g., a RSRP) of a downlink reference signaling (e.g., a SSB or a CSI-RS), and the UE performs Msg1 transmission using the selected beam. The selected beam may also be referred to as a selected SSB/CSI-RS. The UE may determine whether to use legacy RA or to use coverage-enhanced RA based on a measured RSRP of the selected SSB/CSI-RS. For example, the UE may determine whether to use legacy RA or to use coverage-enhanced RA upon (and/or in response to) selecting the selected beam, such as upon (and/or in response to) selecting the selected SSB/CSI-RS.

In an example, if the measured RSRP of the selected SSB/CSI-RS is less than a second threshold, the UE uses coverage-enhanced RA (e.g., the UE performs the RA procedure as a coverage-enhanced RA).

Alternatively and/or additionally, if the measured RSRP of the selected SSB/CSI-RS is not less than the second threshold, the UE uses legacy RA (e.g., the UE performs the RA procedure as a legacy RA).

The second threshold may be provided by the network (e.g., the network may transmit an indication of the second threshold to the UE). The second threshold may be provided in System Information (e.g., SIB1). Alternatively and/or additionally, the second threshold may be provided in an RA-related configuration (e.g., RACH-ConfigCommon).

In an example in which the UE selects an SSB (e.g., the selected SSB/CSI-RS is a selected SSB), the second threshold may be rsrp-ThresholdSSB (e.g., the second threshold may be rsrp-ThresholdSSB if the UE selects an SSB). Alternatively and/or additionally, in the example in which the UE selects an SSB (e.g., the selected SSB/CSI-RS is a selected SSB), the second threshold may be a threshold other than rsrp-ThresholdSSB. In some examples, the second threshold and the rsrp-ThresholdSSB may be used for a same type of UE (e.g., a Reduced Capability UE). Alternatively and/or additionally, the second threshold and the rsrp-ThresholdSSB may be provided in System Information for a same type of UE (e.g., a Reduced Capability UE).

In an example in which the UE selects a CSI-RS (e.g., the selected SSB/CSI-RS is a selected CSI-RS), the second threshold may be rsrp-ThresholdCSI-RS (e.g., the second threshold may be rsrp-ThresholdCSI-RS if the UE selects a CSI-RS). Alternatively and/or additionally, in the example in which the UE selects a CSI-RS (e.g., the selected SSB/CSI-RS is a selected a CSI-RS), the second threshold may be a threshold other than rsrp-ThresholdCSI-RS. In some examples, the second threshold and the rsrp-ThresholdCSI-RS may be used for a same type of UE (e.g., a Reduced Capability UE). Alternatively and/or additionally, the second threshold and the rsrp-ThresholdCSI-RS may be provided in System Information for a same type of UE (e.g., a Reduced Capability UE).

In some examples, the UE may perform a determination (of whether to use legacy RA or to use coverage-enhanced RA) upon (and/or in response to) each time that a SSB or a CSI-RS is selected (by the UE, for example) for Msg1 transmission (e.g., Msg1 transmission of a RA procedure).

In the third embodiment, upon (and/or in response to) having (e.g., obtaining, such as receiving) a UL grant for Msg3 transmission (e.g., Msg3 transmission of a RA procedure, such as a new transmission of Msg3 or a retransmission of Msg3), the UE determines whether to use legacy RA or to use coverage-enhanced RA based on a number of Msg3 transmission attempts. In some examples, a Msg3 transmission attempt may correspond to an attempt, by the UE, to transmit Msg3 of the RA procedure to a network.

In some examples, the UE may count the number of Msg3 transmission attempts (including an initial Msg3 transmission attempt, for example) using a second counter. In some examples, the UE may increment the second counter (by one, for example) for each Msg3 transmission attempt (e.g., each Msg3 transmission attempt of the RA procedure). For example, the UE may increment the second counter (by one, for example) upon (and/or in response to) each Msg3 transmission attempt (e.g., each Msg3 transmission attempt of the RA procedure).

In some examples, the UE may not increment the second counter (by one, for example) for a Msg3 transmission attempt within a first Msg1 transmission attempt if a first selected SSB/CSI-RS in the first Msg1 transmission attempt (e.g., the first selected SSB/CSI-RS is selected and/or used for the first Msg1 transmission attempt) is different from a second selected SSB/CSI-RS in a previous Msg1 transmission attempt (e.g., the second selected SSB/CSI-RS is selected and/or used for the previous Msg1 transmission attempt). In some examples, the Msg3 transmission attempt being "within" the first Msg1 transmission attempt means that the first Msg1 transmission attempt is the most recent Msg1 transmission attempt, of the RA procedure, that is prior to the Msg3 transmission attempt. The previous Msg1 transmission attempt may be a Msg1 transmission attempt that precedes the first Msg1 transmission attempt, such as where the previous Msg1 transmission attempt is a most recent Msg1 transmission attempt that precedes the first Msg1 transmission attempt. In an example, the UE may not increment the second counter in response to the Msg3 transmission attempt within the first Msg1 transmission attempt based on the first selected SSB/CSI-RS in the first Msg1 transmission attempt being different from the second selected SSB/CSI-RS in the previous Msg1 transmission attempt. The first selected SSB/CSI-RS in the first Msg1 transmission attempt may be different from the second selected SSB/CSI-RS in the previous Msg1 transmission attempt if a beam used for transmitting Msg1 has changed from the previous Msg1 transmission attempt to the first Msg1 transmission attempt. For example, the first Msg1 transmission attempt may be performed using the first selected SSB/CSI-RS (e.g., the first Msg1 transmission attempt may be performed using a beam associated with the first selected SSB/CSI-RS) and/or the previous Msg1 transmission attempt may be performed using the second selected SSB/CSI-RS (e.g., the previous Msg1 transmission attempt may be performed using a beam associated with the second selected SSB/CSI-RS), wherein the second selected SSB/CSI-RS is different from the first selected SSB/CSI-RS.

In some examples, the UE may increment the second counter (by one, for example) for a Msg3 transmission attempt within a first Msg1 transmission attempt if a first selected SSB/CSI-RS in the first Msg1 transmission attempt (e.g., the first selected SSB/CSI-RS is selected and/or used for the first Msg1 transmission attempt) is the same as a second selected SSB/CSI-RS in a previous Msg1 transmission attempt (e.g., the second selected SSB/CSI-RS is selected and/or used for the previous Msg1 transmission attempt). The previous Msg1 transmission attempt may be a Msg1 transmission attempt that precedes the first Msg1 transmission attempt, such as where the previous Msg1 transmission attempt is a most recent Msg1 transmission attempt that precedes the first Msg1 transmission attempt. In an example, the UE may increment the second counter (by one, for example) in response to the Msg3 transmission attempt within the first Msg1 transmission attempt based on the first selected SSB/CSI-RS in the first Msg1 transmission attempt being the same as the second selected SSB/CSI-RS in the previous Msg1 transmission attempt. The first selected SSB/CSI-RS in the first Msg1 transmission attempt may be the same as the second selected SSB/CSI-RS in the previous Msg1 transmission attempt if a beam used for transmitting Msg1 has not changed from the previous Msg1 transmission attempt to the first Msg1 transmission attempt. For example, the first Msg1 transmission attempt and the previous Msg1 transmission attempt may be performed using the same selected SSB/CSI-RS (e.g., the first Msg1 transmission attempt and the previous Msg1 transmission attempt may be performed using the same beam associated with the same selected SSB/CSI-RS).

In an example, if the second counter is larger than a third threshold (e.g., if the second counter indicates a counter value that is larger than the third threshold), the UE uses coverage-enhanced RA for the Msg3 transmission (e.g., the UE performs the Msg3 transmission with Msg3 repetitions). For example, the UE may use coverage-enhanced RA for the Msg3 transmission based on a determination that the second counter is larger than the third threshold.

Alternatively and/or additionally, if the second counter is not larger than the third threshold, the UE may use legacy RA for the Msg3 transmission (e.g., the UE performs the Msg3 transmission without performing Msg3 repetitions, such as by transmitting Msg3 once in the Msg3 transmission). For example, the UE may use legacy RA for the Msg3 transmission based on a determination that the second counter is not larger than the third threshold.

The third threshold may be provided by the network (e.g., the network may transmit an indication of the third threshold to the UE). The third threshold may be provided in System Information (e.g., SIB1). Alternatively and/or additionally, the third threshold may be provided in an RA-related configuration (e.g., RACH-ConfigCommon). In some examples, the third threshold may be a threshold other than preambleTransMax. For example, the third threshold may have a value smaller than a value of preambleTransMax. In some examples, the third threshold and the preambleTransMax may be used for a same type of UE (e.g., a Reduced Capability UE). Alternatively and/or additionally, the third threshold and the preambleTransMax may be provided in System Information for a same type of UE (e.g., a Reduced Capability UE).

In some examples, the UE may initialize the second counter (e.g., set the second counter to zero) before the UE performs a Msg3 transmission (e.g., the UE may initialize the second counter before the UE performs a Msg3 transmission for the first time within the RA procedure). In an example, the UE may initialize the second counter (e.g., set the second counter to zero) in response to receiving a Message 2 (Msg2) within the RA procedure (e.g., the UE may initialize the second counter in response to the UE receiving the Msg2 for the first time within the RA procedure).

In some examples, the UE may reset (and/or initialize) the second counter (e.g., set the second counter to zero) upon (and/or in response to) a Msg1 transmission attempt (e.g., the UE may set the second counter to zero upon and/or in response to each Msg1 transmission attempt by the UE). In this way, the second counter counts a number of Msg3 transmission attempts within a single Msg1 transmission attempt. For example, the second counter may be representative of a number of Msg3 transmission attempts that are within a single Msg1 transmission attempt (e.g., a most recent Msg1 transmission attempt) and/or the second counter may not count Msg3 transmission attempts that are prior to the single Msg1 transmission attempt (e.g., the most recent Msg1 transmission attempt). Alternatively, the UE may not reset the second counter (e.g., the UE may not set the second counter to zero) upon (and/or in response to) a Msg1 transmission attempt (e.g., the UE may not set the second counter to zero upon and/or in response to each Msg1 transmission attempt by the UE). In this way, the second counter may count a number of Msg3 transmission attempts across multiple Msg1 transmission attempts.

In some examples, the UE may reset (and/or initialize) the second counter (e.g., set the second counter to zero) upon (and/or in response to) a first Msg1 transmission attempt if a first selected SSB/CSI-RS in the first Msg1 transmission attempt is different from a second selected SSB/CSI-RS in a previous Msg1 transmission attempt (e.g., the previous Msg1 transmission attempt may be a Msg1 transmission attempt that precedes the first Msg1 transmission attempt, such as where the previous Msg1 transmission attempt is a most recent Msg1 transmission attempt that precedes the first Msg1 transmission attempt). The first selected SSB/CSI-RS in the first Msg1 transmission attempt may be different from the second selected SSB/CSI-RS in the previous Msg1 transmission attempt if a beam used for transmitting Msg1 has changed from the previous Msg1 transmission attempt to the first Msg1 transmission attempt. For example, the first Msg1 transmission attempt may be performed using the first selected SSB/CSI-RS (e.g., the first Msg1 transmission attempt may be performed using a beam associated with the first selected SSB/CSI-RS) and/or the previous Msg1 transmission attempt may be performed using the second selected SSB/CSI-RS (e.g., the previous Msg1 transmission attempt may be performed using a beam associated with the second selected SSB/CSI-RS), wherein the second selected SSB/CSI-RS is different from the first selected SSB/CSI-RS. Alternatively, the UE may not reset the second counter (e.g., the UE may not set the second counter to zero) upon (and/or in response to) the first Msg1 transmission attempt if the first selected SSB/CSI-RS in the first Msg1 transmission attempt is different from the second selected SSB/CSI-RS in the previous Msg1 transmission attempt.

In some examples, the UE may perform a determination (of whether to use legacy RA or to use coverage-enhanced RA for the RA procedure, such as for the Msg3 transmission of the RA procedure) upon (and/or in response to) each time that the UE has (e.g., obtains, such as receives) a UL grant for Msg3 transmission (e.g., Msg3 transmission of a RA procedure, such as a new transmission of Msg3 or a retransmission of Msg3).

In the fourth embodiment, the UE determines whether to use legacy RA or to use coverage-enhanced RA based on a number of Msg1 transmission attempts or based on a number of power ramping steps for Msg1 transmission. In some examples, a Msg1 transmission attempt may correspond to an attempt, by the UE, to transmit Msg1 of an RA procedure to a network.

In some examples, the UE may count the number of Msg1 transmission attempts (e.g., RA preamble transmission attempts) using a third counter. For example, the number of Msg1 transmission attempts may be represented by the third counter (e.g., a counter value of the third counter may be representative of the number of Msg1 transmission attempts). The UE may increment the third counter (by one, for example) for each Msg1 transmission attempt. For example, the UE may increment the third counter (by one, for example) upon (and/or in response to) each Msg1 transmission attempt. In some examples, the UE may reset (and/or initialize) the third counter (e.g., set the third counter to zero) upon (and/or in response to) initiation of a RA procedure.

Alternatively, the UE may count the number of power ramping steps (e.g., power ramping steps for Msg1 transmission) using the third counter. For example, the number of power ramping steps for Msg1 transmission may be represented by the third counter (e.g., a counter value of the third counter may be representative of the number of power ramping steps for Msg1 transmission). The UE may increment the third counter (by one, for example) when power ramping is applied (e.g., when power ramping is applied for Msg1 transmission, such as transmission of a RA preamble). For example, the UE may increment the third counter (by one, for example) upon (and/or in response to) each time that power ramping is applied. In some examples, the UE may reset (and/or initialize) the third counter (e.g., set the third counter to zero) upon (and/or in response to) initiation of a RA procedure.

In some examples, the UE may not increment the third counter (by one, for example) upon (and/or in response to) a first Msg1 transmission attempt if a first selected SSB/CSI-RS in the first Msg1 transmission attempt is different from a second selected SSB/CSI-RS in a previous Msg1 transmission attempt (e.g., the previous Msg1 transmission attempt may be a Msg1 transmission attempt that precedes the first Msg1 transmission attempt, such as where the previous Msg1 transmission attempt is a most recent Msg1 transmission attempt that precedes the first Msg1 transmission attempt). The first selected SSB/CSI-RS in the first Msg1 transmission attempt may be different from the second selected SSB/CSI-RS in the previous Msg1 transmission attempt if a beam used for transmitting Msg1 has changed from the previous Msg1 transmission attempt to the first Msg1 transmission attempt. The first Msg1 transmission attempt may be performed using the first selected SSB/CSI-RS (e.g., the first Msg1 transmission attempt may be performed using a beam associated with the first selected SSB/CSI-RS) and/or the previous Msg1 transmission attempt may be performed using the second selected SSB/CSI-RS (e.g., the previous Msg1 transmission attempt may be performed using a beam associated with the second selected SSB/CSI-RS). In some examples, the UE may increment the third counter (by one, for example) upon (and/or in response to) the first Msg1 transmission attempt if the first selected SSB/CSI-RS in the first Msg1 transmission attempt is the same as the second selected SSB/CSI-RS in the previous Msg1 transmission attempt (e.g., the beam used for transmitting Msg1 does not change from the previous Msg1 transmission attempt to the first Msg1 transmission attempt).

In some examples, the UE may not increment the third counter (by one, for example) upon (and/or in response to) applying power ramping for a first Msg1 transmission attempt if a first selected SSB/CSI-RS in the first Msg1 transmission attempt is different from a second selected SSB/CSI-RS in a previous Msg1 transmission attempt (e.g., the previous Msg1 transmission attempt may be a Msg1 transmission attempt that precedes the first Msg1 transmission attempt, such as where the previous Msg1 transmission attempt is a most recent Msg1 transmission attempt that precedes the first Msg1 transmission attempt). The first selected SSB/CSI-RS in the first Msg1 transmission attempt may be different from the second selected SSB/CSI-RS in the previous Msg1 transmission attempt if a beam used for transmitting Msg1 has changed from the previous Msg1 transmission attempt to the first Msg1 transmission attempt. In some examples, the UE may increment the third counter (by one, for example) upon (and/or in response to) applying power ramping for the first Msg1 transmission attempt if the first selected SSB/CSI-RS in the first Msg1 transmission attempt is the same as the second selected SSB/CSI-RS in the previous Msg1 transmission attempt (e.g., the beam used for transmitting Msg1 does not change from the previous Msg1 transmission attempt to the first Msg1 transmission attempt).

In an example, if the third counter is larger than a fourth threshold (e.g., if the third counter indicates a counter value that is larger than the fourth threshold), the UE uses coverage-enhanced RA for the Msg1 transmission (e.g., the UE performs the Msg1 transmission with Msg1 repetitions). For example, the UE may use coverage-enhanced RA for the Msg1 transmission based on a determination that the third counter is larger than the fourth threshold.

Alternatively and/or additionally, if the third counter is not larger than the fourth threshold, the UE may use legacy RA for the Msg1 transmission (e.g., the UE performs the Msg1 transmission without performing Msg1 repetitions, such as by transmitting Msg1 once in the Msg1 transmission). For example, the UE may use legacy RA for the Msg1 transmission based on a determination that the third counter is not larger than the fourth threshold.

Alternatively and/or additionally, if the third counter is larger than the fourth threshold (e.g., if the third counter indicates a counter value that is larger than the fourth threshold), the UE uses coverage-enhanced RA for a Msg3 transmission of a RA procedure (e.g., a RA procedure in which the Msg1 transmission is performed). For example, the UE may use coverage-enhanced RA for the Msg3 transmission (e.g., the UE performs the Msg3 transmission with Msg3 repetitions) based on a determination that the third counter is larger than the fourth threshold.

Alternatively and/or additionally, if the third counter is not larger than the fourth threshold (e.g., if the third counter indicates a counter value that is larger than the fourth threshold), the UE may use legacy RA for the Msg3 transmission (e.g., the UE performs the Msg3 transmission without performing Msg3 repetitions, such as by transmitting Msg3 once in the Msg3 transmission). For example, the UE may use legacy RA for the Msg3 transmission based on a determination that the third counter is not larger than the fourth threshold.

The fourth threshold may be provided by the network (e.g., the network may transmit an indication of the fourth threshold to the UE). The fourth threshold may be provided in System Information (e.g., SIB1). Alternatively and/or additionally, the fourth threshold may be provided in an RA-related configuration (e.g., RACH-ConfigCommon). In some examples, the fourth threshold may be a threshold other than preambleTransMax.

In some examples, such as in an example in which the third counter is representative of the number of Msg1 transmission attempts, the third counter may be PREAMBLE_TRANSMISSION_COUNTER. Alternatively and/or additionally, the third counter may be a counter other than PREAMBLE_TRANSMISSION_COUNTER.

In some examples, such as in an example in which the third counter is representative of the number of power ramping steps for Msg1 transmission, the third counter may be PREAMBLE_POWER_RAMPING_COUNTER. Alternatively and/or additionally, the third counter may be a counter other than PREAMBLE_POWER_RAMPING_COUNTER.

In some examples, the UE may perform a determination (of whether to use legacy RA or to use coverage-enhanced RA for the RA procedure, such as for the Msg3 transmission of the RA procedure) upon (and/or in response to and/or after) the UE considering Random Access Response (RAR) reception (e.g., Msg2 of a RA procedure) not to be successful. For example, the UE may perform a determination (of whether to use legacy RA or to use coverage-enhanced RA for the RA procedure, such as for the Msg3 transmission of the RA procedure) upon (and/or in response to and/or after) each time that the UE considers an RAR reception (e.g., Msg2 of a RA procedure) not to be successful.

In some examples, the UE may perform a determination (of whether to use legacy RA or to use coverage-enhanced RA for the RA procedure, such as for the Msg3 transmission of the RA procedure) upon (and/or in response to and/or after) the UE considering Contention Resolution (e.g., Contention Resolution for Message 4 (Msg4) of a RA procedure) not successful. For example, the UE may perform a determination (of whether to use legacy RA or to use coverage-enhanced RA for the RA procedure, such as for the Msg3 transmission of the RA procedure) upon (and/or in response to and/or after) each time that the UE considers a Contention Resolution (e.g., Contention Resolution for Msg4 of a RA procedure) not to be successful.

In some examples, the UE may perform a determination (of whether to use legacy RA or to use coverage-enhanced RA for the RA procedure, such as for the Msg3 transmission of the RA procedure) upon (and/or in response to and/or before or after) a backoff time (e.g., PREAMBLE_BACK-OFF). For example, the UE may perform a determination (of whether to use legacy RA or to use coverage-enhanced RA for the RA procedure, such as for the Msg3 transmission of the RA procedure) upon (and/or in response to and/or before or after) each backoff time (e.g., PREAMBLE_BACKOFF).

In some examples, the UE may perform a determination (of whether to use legacy RA or to use coverage-enhanced RA for the RA procedure, such as for the Msg3 transmission of the RA procedure) upon (and/or in response to and/or before or after) a start or completion of a backoff time (e.g., PREAMBLE_BACKOFF). For example, the UE may perform a determination (of whether to use legacy RA or to use coverage-enhanced RA for the RA procedure, such as for the Msg3 transmission of the RA procedure) upon (and/or in response to and/or before or after) each time that a backoff time (e.g., PREAMBLE_BACKOFF) is started or completed.

In some examples, the UE may perform a determination (of whether to use legacy RA or to use coverage-enhanced RA for the RA procedure, such as for the Msg3 transmission of the RA procedure) upon (and/or in response to and/or before or after) performing Random Access Resource selection (e.g., Random Access Resource selection for Msg1 transmission). For example, the UE may perform a determination (of whether to use legacy RA or to use coverage-enhanced RA for the RA procedure, such as for the Msg3 transmission of the RA procedure) upon (and/or in response to and/or before or after) each time that the UE performs Random Access Resource selection (e.g., Random Access Resource selection for Msg1 transmission).

In some examples, the UE may perform a determination (of whether to use legacy RA or to use coverage-enhanced RA for the RA procedure, such as for the Msg3 transmission of the RA procedure) upon (and/or in response to and/or before or after) performing a Msg1 transmission. For example, the UE may perform a determination (of whether to use legacy RA or to use coverage-enhanced RA for the RA procedure, such as for the Msg3 transmission of the RA procedure) upon (and/or in response to and/or before or after) each time that the UE performs a Msg1 transmission.

In the fifth embodiment, upon (and/or in response to) having (e.g., obtaining, such as receiving) a UL grant for Msg3 transmission (e.g., Msg3 transmission of a RA procedure, such as a new transmission of Msg3 or a retransmission of Msg3), the UE determines whether to use legacy RA or to use coverage-enhanced RA (for the Msg3 transmission, for example) based on an indication from the network.

In some examples, the network may indicate to (e.g., instruct) the UE whether the UE is to perform repetition of Msg3 (e.g., the network transmits, to the UE, the indication indicative of whether or not the UE is to perform repetition of Msg3 and/or the UE may determine whether or not to perform repetition of Msg3 based on the indication). For example, the network may indicate to (e.g., instruct) the UE whether the UE is to use legacy RA or to use coverage-enhanced RA for the Msg3 transmission (e.g., the network transmits, to the UE, the indication indicative of whether the UE is to use legacy RA or to use coverage-enhanced RA for the Msg3 transmission). The indication may be included in Msg2 (e.g., RAR of a RA procedure). The indication may be included in the UL grant received by the UE from the network.

In some examples, if the network indicates (in Msg2, for example) that the UE is to use coverage-enhanced RA for the Msg3 transmission, the UE uses coverage-enhanced RA for the Msg3 transmission for Msg3 transmission attempts within the same Msg1 transmission attempt (e.g., all Msg3 transmission attempts within the same Msg1 transmission attempt).

In some examples, the UE may perform a determination (of whether to use legacy RA or to use coverage-enhanced RA for the RA procedure, such as for the Msg3 transmission of the RA procedure) upon (and/or in response to) having (e.g., obtaining, such as receiving) a UL grant for Msg3 transmission (e.g., Msg3 transmission of a RA procedure, such as a new transmission of Msg3 or a retransmission of Msg3). For example, the UE may perform a determination (of whether to use legacy RA or to use coverage-enhanced RA for the RA procedure, such as for the Msg3 transmission of the RA procedure) upon (and/or in response to) each time that the UE has (e.g., obtains, such as receives) a UL grant for Msg3 transmission (e.g., Msg3 transmission of a RA procedure, such as a new transmission of Msg3 or a retransmission of Msg3).

Alternatively and/or additionally, the UE may perform a determination (of whether to use legacy RA or to use coverage-enhanced RA for the RA procedure, such as for the Msg3 transmission of the RA procedure) upon (and/or in response to) having (e.g., obtaining, such as receiving) a UL grant (in a Msg2, for example) for an initial Msg3 transmission, such as an initial Msg3 transmission associated with (e.g., within and/or after) a Msg1 transmission attempt (e.g., the UE may be provided with the UL grant via the Msg2).

In the sixth embodiment, the UE determines whether to use legacy RA or to use coverage-enhanced RA based on a first transmission power of Msg1 and/or a second transmission power of Msg3.

In some examples, the first transmission power of Msg1 may be PREAMBLE_RECEIVED_TARGET_POWER. Alternatively and/or additionally, the first transmission power of Msg1 may be based on PREAMBLE_RECEIVED_TARGET_POWER (e.g., the UE may use PREAMBLE_RECEIVED_TARGET_POWER to calculate the first transmission power of Msg1).

In some examples, the second transmission power of Msg3 may be based on PREAMBLE_RECEIVED_TARGET_POWER (e.g., the UE may use PREAMBLE_RECEIVED_TARGET_POWER to calculate the second transmission power of Msg3).

In an example, if PREAMBLE_RECEIVED_TARGET_POWER meets (e.g., reaches or exceeds) a fifth threshold, the UE uses coverage-enhanced RA for the Msg1 transmission (e.g., the UE performs the Msg1 transmission with Msg1 repetitions). For example, the UE may use coverage-enhanced RA for the Msg1 transmission based on a determination that PREAMBLE_RECEIVED_TARGET_POWER meets the fifth threshold. Alternatively and/or additionally, if PREAMBLE_RECEIVED_TARGET_POWER does not meet (e.g., does not reach or exceed) the fifth threshold, the UE may use legacy RA for the Msg1 transmission (e.g., the UE performs the Msg1 transmission without performing Msg1 repetitions, such as by transmitting Msg1 once in the Msg1 transmission). For example, the UE may use legacy RA for the Msg1 transmission based on a determination that PREAMBLE_RECEIVED_TARGET_POWER does not meet the fifth threshold.

In an example, if PREAMBLE_RECEIVED_TARGET_POWER meets (e.g., reaches or exceeds) a sixth threshold, the UE uses coverage-enhanced RA for the Msg3 transmission (e.g., the UE performs the Msg3 transmission with Msg3 repetitions). For example, the UE may use coverage-enhanced RA for the Msg3 transmission based on a determination that PREAMBLE_RECEIVED_TARGET_POWER meets the sixth threshold. Alternatively and/or additionally, if PREAMBLE_RECEIVED_TARGET_POWER does not meet (e.g., does not reach or exceed) the sixth threshold, the UE may use legacy RA for the Msg3 transmission (e.g., the UE performs the Msg3 transmission without performing Msg3 repetitions, such as by transmitting Msg3 once in the Msg3 transmission). For example, the UE may use legacy RA for the Msg3 transmission based on a determination that PREAMBLE_RECEIVED_TARGET_POWER does not meet the sixth threshold. In some examples, the sixth threshold is the same as the fifth threshold. Alternatively and/or additionally, the sixth threshold may be different from the fifth threshold.

In an example, if the first transmission power of Msg1 meets (e.g., reaches or exceeds) a seventh threshold (e.g., if a lower layer of the UE indicates that the first transmission power of Msg1 meets the seventh threshold), the UE uses coverage-enhanced RA for the Msg1 transmission (e.g., the UE performs the Msg1 transmission with Msg1 repetitions). For example, the UE may use coverage-enhanced RA for the Msg1 transmission based on a determination that the first transmission power of Msg1 meets the seventh threshold. Alternatively and/or additionally, if the first transmission power of Msg1 does not meet (e.g., does not reach or exceed) the seventh threshold (e.g., if a lower layer of the UE indicates that the first transmission power of Msg1 does not meet the seventh threshold), the UE may use legacy RA for the Msg1 transmission (e.g., the UE performs the Msg1 transmission without performing Msg1 repetitions, such as by transmitting Msg1 once in the Msg1 transmission). For example, the UE may use legacy RA for the Msg1 transmission based on a determination that the first transmission power of Msg1 does not meet the seventh threshold. In some examples, the seventh threshold is the same as the fifth threshold and/or the sixth threshold. Alternatively and/or additionally, the seventh threshold may be different from the fifth threshold and/or the sixth threshold.

In an example, if the first transmission power of Msg1 meets (e.g., reaches or exceeds) an eighth threshold (e.g., if a lower layer of the UE indicates that the first transmission power of Msg1 meets the eighth threshold), the UE uses coverage-enhanced RA for the Msg3 transmission (e.g., the UE performs the Msg3 transmission with Msg3 repetitions). For example, the UE may use coverage-enhanced RA for the Msg3 transmission based on a determination that the first transmission power of Msg1 meets the eighth threshold. Alternatively and/or additionally, if the first transmission power of Msg1 does not meet (e.g., does not reach or exceed) the eighth threshold (e.g., if a lower layer of the UE indicates that the first transmission power of Msg1 does not meet the eighth threshold), the UE may use legacy RA for the Msg3 transmission (e.g., the UE performs the Msg3 transmission without performing Msg3 repetitions, such as by transmitting Msg3 once in the Msg3 transmission). For example, the UE may use legacy RA for the Msg3 transmission based on a determination that the first transmission power of Msg1 does not meet the eighth threshold. In some examples, the eighth threshold is the same as the fifth threshold, the sixth threshold and/or the seventh threshold. Alternatively and/or additionally, the eighth threshold may be different from the fifth threshold, the sixth threshold and/or the seventh threshold.

In some examples, the fifth threshold, the sixth threshold, the seventh threshold and/or the eighth threshold may be (and/or may be based on) a UE maximum transmission power of the UE. Alternatively and/or additionally, the fifth threshold, the sixth threshold, the seventh threshold and/or the eighth threshold may be provided by the network (e.g., the network may transmit an indication of the fifth threshold, the sixth threshold, the seventh threshold and/or the eighth threshold to the UE). The fifth threshold, the sixth threshold, the seventh threshold and/or the eighth threshold may be provided in System Information (e.g., SIB1). Alternatively and/or additionally, the fifth threshold, the sixth threshold, the seventh threshold and/or the eighth threshold may be provided in an RA-related configuration (e.g., RACH-ConfigCommon).

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or after) the UE considering RAR reception (e.g., Msg2 of a RA procedure) not successful. For example, the UE may perform a determination (of whether to use legacy RA or to use coverage-enhanced RA for the RA procedure, such as for the Msg3 transmission and/or the Msg1 transmission of the RA procedure) upon (and/or in response to and/or after) each time that the UE considers an RAR reception (e.g., Msg2 of a RA procedure) not to be successful.

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or after) the UE considering Contention Resolution (e.g., Contention Resolution for Msg4 of a RA procedure) not successful. For example, the UE may perform a determination (of whether to use legacy RA or to use coverage-enhanced RA for the RA procedure, such as for the Msg3 transmission and/or the Msg1 transmission of the RA procedure) upon (and/or in response to and/or after) each time that the UE considers a Contention Resolution (e.g., Contention Resolution for Msg4 of a RA procedure) not to be successful.

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) a backoff time (e.g., PREAMBLE_BACKOFF). For example, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) each backoff time (e.g., PREAMBLE_BACKOFF).

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) a start or completion of a backoff time (e.g., PREAMBLE_BACKOFF). For example, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) each time that a backoff time (e.g., PREAMBLE_BACKOFF) is started or completed.

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) performing Random Access Resource selection (e.g., Random Access Resource selection for Msg1 transmission). For example, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) each time that the UE performs Random Access Resource selection (e.g., Random Access Resource selection for Msg1 transmission).

In some examples, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) performing a Msg1 transmission. For example, the UE may perform a determination (of whether to use legacy RA or to use coverage-enhanced RA for the RA procedure, such as for the Msg3 transmission and/or the Msg1 transmission of the RA procedure) upon (and/or in response to and/or before or after) each time that the UE performs a Msg1 transmission.

One, some and/or all of the foregoing techniques and/or embodiments can be formed to a new embodiment.

In some examples, embodiments disclosed herein, such as embodiments described with respect to the first embodiment, the second embodiment, the third embodiment, the fourth embodiment, the fifth embodiment and the sixth embodiment, may be implemented independently and/or separately. Alternatively and/or additionally, a combination of embodiments described herein, such as embodiments described with respect to the first embodiment, the second embodiment, the third embodiment, the fourth embodiment, the fifth embodiment and/or the sixth embodiment, may be implemented. Alternatively and/or additionally, a combination of embodiments described herein, such as embodiments described with respect to the first embodiment, the second embodiment, the third embodiment, the fourth embodiment, the fifth embodiment and/or the sixth embodiment, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

In a first example, upon (and/or in response to) initiation of a RA procedure, the UE determines to use legacy RA based on a measured RSRP of a downlink pathloss reference (e.g., in accordance with the first embodiment). After determining to use legacy RA, upon (and/or in response to) having a UL grant for Msg3 transmission (e.g., Msg3 transmission of the RA procedure, such as a new transmission of Msg3 or a retransmission of Msg3), the UE determines whether to use legacy RA or to use coverage-enhanced RA based on a number of Msg3 transmission attempts (e.g., in accordance with the third embodiment). In the first example, the UE may not reset (and/or may not initialize) the second counter (e.g., the UE may not set the second counter to zero) for each (e.g., in response to each) Msg1 transmission attempt (e.g., each Msg1 transmission attempt of the RA procedure).

In a second example, upon (and/or in response to) selecting a SSB or a CSI-RS for Msg1 transmission (e.g., Msg1 transmission of a RA procedure), the UE determines to use legacy RA based on a measured RSRP of the selected SSB/CSI-RS (e.g., in accordance with the second embodiment). After determining to use legacy RA, upon (and/or in response to) having a UL grant for Msg3 transmission (e.g., Msg3 transmission of the RA procedure, such as a new transmission of Msg3 or a retransmission of Msg3), the UE determines whether to use legacy RA or to use coverage-enhanced RA based on a number of Msg3 transmission attempts (e.g., in accordance with the third embodiment). In the second example, the UE may reset (and/or may initialize) the second counter (e.g., the UE may set the second counter to zero) for each (e.g., in response to each) Msg1 transmission attempt (e.g., each Msg1 transmission attempt of the RA procedure).

In a third example, upon (and/or in response to) selecting a SSB or CSI-RS for Msg1 transmission (e.g., Msg1 transmission of a RA procedure), the UE determines to use legacy RA based on a measured RSRP of the selected SSB/CSI-RS (e.g., in accordance with the second embodiment). After determining to use legacy RA, upon (and/or in response to) having (e.g., obtaining, such as receiving) a UL grant for Msg3 transmission (e.g., Msg3 transmission of the RA procedure, such as a new transmission of Msg3 or a retransmission of Msg3), if the network indicates (in Msg2, for example) that the UE should use coverage-enhanced RA, the UE uses coverage-enhanced RA (e.g., in accordance with the fifth embodiment). Alternatively and/or additionally, upon (and/or in response to) having (e.g., obtaining, such as receiving) a UL grant for Msg3 transmission (e.g., Msg3 transmission of the RA procedure, such as a new transmission of Msg3 or a retransmission of Msg3), if the network does not indicate (in Msg2, for example) that the UE should use coverage-enhanced RA, the UE uses legacy RA (e.g., in accordance with the fifth embodiment).

In a fourth example, upon (and/or in response to) initiation of a RA procedure, the UE determines to use legacy RA based on a measured RSRP of a downlink pathloss reference (e.g., in accordance with the first embodiment). After determining to use legacy RA, the UE determines whether to use legacy RA or to use coverage-enhanced RA based on a transmission power of Msg1 (e.g., in accordance with the sixth embodiment).

In a fifth example, upon (and/or in response to) initiation of a RA procedure, the UE determines to use coverage-enhanced RA (e.g., the UE determines to use one or more PRACH resources for coverage-enhanced RA) based on a measured RSRP of a downlink pathloss reference (e.g., in accordance with the first embodiment). After determining to use coverage-enhanced RA (e.g., after determining to use the one or more PRACH resources for coverage-enhanced RA), upon (and/or in response to) having (e.g., obtaining, such as receiving) a UL grant for Msg3 transmission (e.g., Msg3 transmission of the RA procedure, such as a new transmission of Msg3 or a retransmission of Msg3), if the network indicates (in Msg2, for example) that the UE should perform one or more repetitions of Msg3 (e.g., one or more Msg3 transmission repetitions), the UE performs one or more repetitions of Msg3 (e.g., in accordance with the fifth embodiment). Alternatively and/or additionally, upon (and/or in response to) having (e.g., obtaining, such as receiving) a UL grant for Msg3 transmission (e.g., Msg3 transmission of the RA procedure, such as a new transmission of Msg3 or a retransmission of Msg3), if the network does not indicate (in Msg2, for example) that the UE should perform repetition of Msg3, the UE does not perform repetition of Msg3 (e.g., the UE performs the Msg3 transmission without performing Msg3 repetitions, such as by transmitting Msg3 once in the Msg3 transmission).

One, some and/or all of the embodiments provided herein (and/or combinations of embodiments provided herein) may be applicable to (e.g., used for) 4-Step RA procedure. One, some and/or all of the embodiments provided herein (and/or combinations of embodiments provided herein) may be applicable to (e.g., used for) 2-Step RA procedure. In an example in which one or more of the techniques of the present disclosure are used in a 2-step RA procedure, the "Msg1" in one, some and/or all of the embodiments provided herein may refer to (and/or may be replaced with) "MsgA preamble". In an example in which one or more of the techniques of the present disclosure are used in a 2-step RA procedure, the "Msg3" in one, some and/or all of the embodiments provided herein may refer to (and/or may be replaced with) "MsgA PUSCH payload". In an example in which one or more of the techniques of the present disclosure are used in a 2-step RA procedure, the "Msg2" in one, some and/or all of the embodiments provided herein may refer to (and/or may be replaced with) "MsgB".

In an example in which one or more of the techniques of the present disclosure are used to perform an RA procedure comprising a 4-step RA procedure, the RA procedure may comprise: (i) transmission, by the UE, of Msg1 (e.g., Msg1 may comprise an RA preamble), (ii) reception, by the UE, of Msg2 (e.g., Msg2 may comprise an RA Response), (iii) transmission, by the UE, of Msg3 (e.g., Msg3 may comprise UL data), and/or (iv) reception, by the UE, of Msg4 (e.g., contention resolution message).

In an example in which one or more of the techniques of the present disclosure are used to perform an RA procedure comprising a 2-step RA procedure, the RA procedure may comprise: (i) transmission, by the UE, of Message A (MsgA) comprising an RA preamble (e.g., MsgA preamble, such as Msg1) and/or uplink data (e.g., MsgA PUSCH payload, such as Msg3), and/or (ii) reception, by the UE, of Message B (MsgB) comprising an RA Response (e.g., Msg2) and/or a contention resolution message (e.g., Msg4).

With respect to one or more embodiments herein, such as one or more techniques, devices, concepts, methods and/or alternatives described above, in some examples, a PRACH resource (e.g., one or more time-frequency domain resource locations and/or one or more RA Preamble indices) for legacy RA may be separated from a PRACH resource for coverage-enhanced RA. The UE may use the PRACH resource for legacy RA if the UE determines to use legacy RA. The UE may use the PRACH resource for coverage-enhanced RA if the UE determines to use coverage-enhanced RA. The UE performs Msg1 transmission based on (e.g., using) the PRACH resource for the corresponding RA. For example, the UE may perform the Msg1 transmission using the PRACH resource for legacy RA if the UE determines to use legacy RA. The UE may perform the Msg1 transmission using the PRACH resource for coverage-enhanced RA if the UE determines to use coverage-enhanced RA.

With respect to one or more embodiments herein, in some examples, the determination of whether to use legacy RA or to use coverage-enhanced RA may correspond to a determination of whether to perform the RA procedure as a legacy RA or to perform the RA procedure as a coverage-enhanced RA.

With respect to one or more embodiments herein, in some examples, the determination of whether to use legacy RA or to use coverage-enhanced RA may correspond to a determination of whether to perform the RA procedure without Msg1 repetitions or to perform the RA procedure with one or more Msg1 repetitions. If the UE determines to use legacy RA, the UE may perform Msg1 transmission of the RA procedure without Msg1 repetitions. If the UE determines to use coverage-enhanced RA, the UE may perform Msg1 transmission of the RA procedure with one or more Msg1 repetitions.

With respect to one or more embodiments herein, in some examples, the determination of whether to use legacy RA or to use coverage-enhanced RA may correspond to a determination of whether to perform the RA procedure without Msg3 repetitions or to perform the RA procedure with one or more Msg3 repetitions. If the UE determines to use legacy RA, the UE may perform Msg3 transmission of the RA procedure without Msg3 repetitions. If the UE determines to use coverage-enhanced RA, the UE may perform Msg3 transmission of the RA procedure with one or more Msg3 repetitions.

With respect to one or more embodiments herein, in some examples, the determination of whether to use legacy RA or to use coverage-enhanced RA may correspond to a determination of whether to use one or more PRACH resources for legacy RA or to use one or more PRACH resources for coverage-enhanced RA. If the UE determines to use the one or more PRACH resources for legacy RA, the UE may use the one or more PRACH resources for legacy RA for Msg1 transmission (e.g., the Msg1 transmission may be performed without Msg1 repetitions). If the UE determines to use the one or more PRACH resources for coverage-enhanced RA, the UE may use the one or more PRACH resources for coverage-enhanced RA for Msg1 transmission (e.g., the Msg1 transmission may be performed with one or more Msg1 repetitions).

With respect to one or more embodiments herein, in some examples, the UE may be in RRC_INACTIVE state. Alternatively and/or additionally, the UE may be in RRC_IDLE state. Alternatively and/or additionally, the UE may be in RRC_CONNECTED state.

One, some and/or all of the embodiments provided herein (and/or combinations of embodiments provided herein) may be applicable to (e.g., used for) and/or supported by a Reduced Capability NR Device (e.g., an NR_Light device), a non-Reduced Capability NR Device and/or a normal NR Device.

Figure 5:
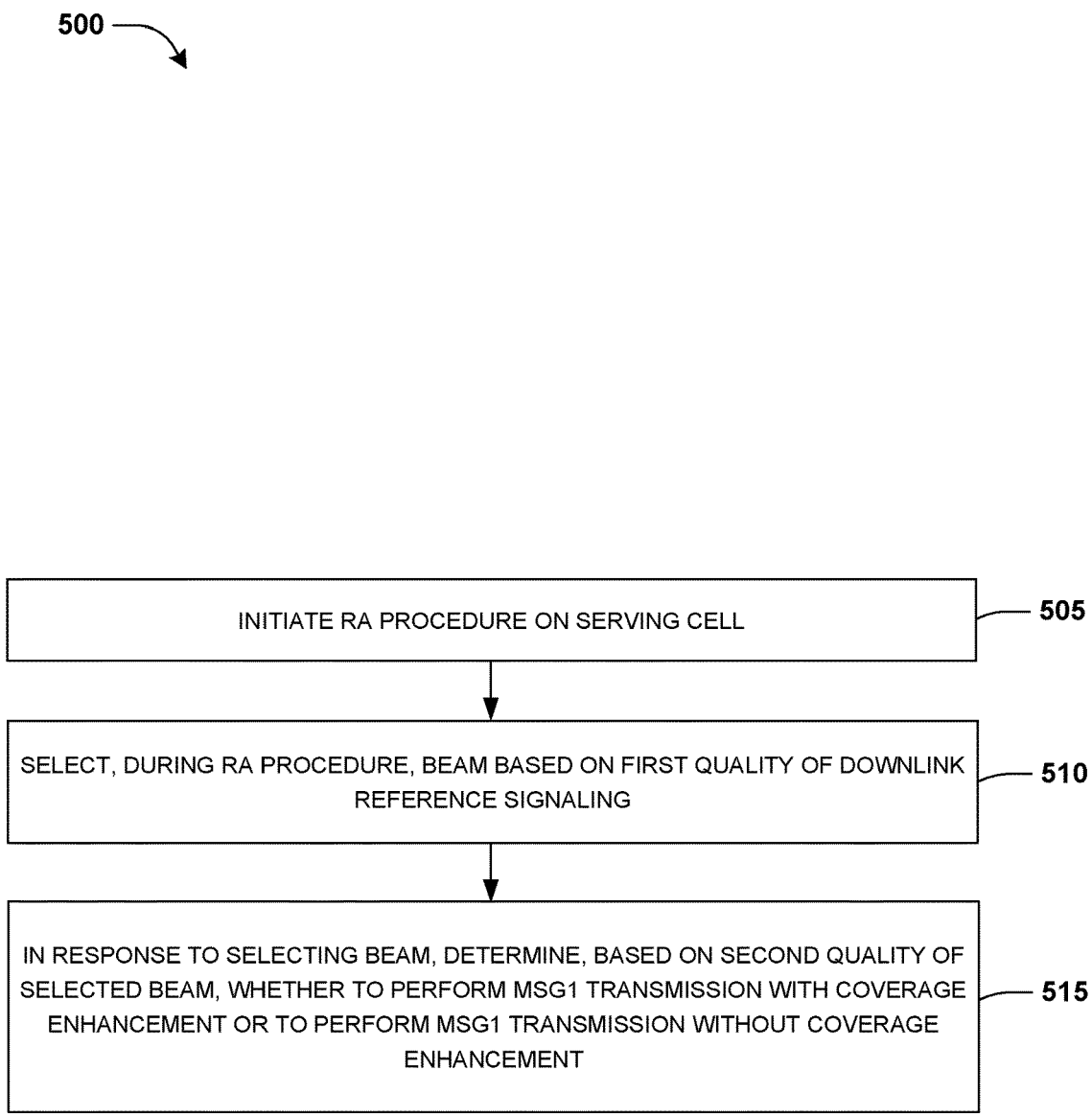
FIG. 5 is a flow chart according to one exemplary embodiment.

FIG. 5 is a flow chart 500 according to one exemplary embodiment from the perspective of a UE. In step 505, the UE initiates a RA procedure on a Serving Cell. In step 510, the UE selects, during the RA procedure, a beam based on a first quality (e.g., a RSRP) of a downlink reference signaling. In step 515, in response to selecting the beam, the UE determines, based on a second quality of the selected beam, whether to perform Msg1 transmission (e.g., Msg1 transmission of the RA procedure) with coverage enhancement or to perform the Msg1 transmission without coverage enhancement.

In one embodiment, the UE determines to perform the Msg1 transmission without coverage enhancement if the second quality of the selected beam is above a threshold (e.g., the UE determines to perform the Msg1 transmission without coverage enhancement based on a determination that the second quality of the selected beam is above the threshold).

In one embodiment, the UE determines to perform the Msg1 transmission with coverage enhancement if the second quality of the selected beam is not above the threshold (e.g., the UE determines to perform the Msg1 transmission with coverage enhancement based on a determination that the second quality of the selected beam is not above the threshold).

In one embodiment, the second quality of the selected beam is a measured RSRP of the selected beam.

In one embodiment, the downlink reference signaling is a SSB or a CSI-RS.

In one embodiment, the threshold is provided in System Information of the Serving Cell. For example, the UE may receive the System Information, wherein the System Information comprises an indication of the threshold.

In one embodiment, the threshold is provided in an RA-related configuration. For example, the UE may be configured with the RA-related configuration, wherein the RA-related configuration comprises an indication of the threshold.

In one embodiment, the threshold is not rsrp-Threshold-SSB (e.g., the threshold is different from rsrp-Threshold-SSB).

In one embodiment, the threshold is not rsrp-Threshold-CSI-RS (e.g., the threshold is different from rsrp-ThresholdCSI-RS).

In one embodiment, the Msg1 transmission with coverage enhancement comprises one or more repetitions of Msg1 on PRACH. For example, if the UE determines to perform the Msg1 transmission with coverage enhancement, the UE may perform the Msg1 transmission comprising one or more repetitions of Msg1 on PRACH. Alternatively and/or additionally, if the UE determines to perform the Msg1 transmission without coverage enhancement, the UE may perform the Msg1 transmission without one or more repetitions of Msg1 on PRACH.

In one embodiment, the UE performs the Msg1 transmission, to the Serving Cell, using the selected beam (e.g., the UE uses the selected beam to transmit Msg1 to the Serving Cell via the Msg1 transmission).

Referring back to FIGS. 3 and 4, in one exemplary embodiment of a UE, the device 300 includes a program code 312 stored in the memory 310. The CPU 308 may execute program code 312 to enable the UE (i) to initiate a RA procedure on a Serving Cell, (ii) to select, during the RA procedure, a beam based on a first quality of a downlink reference signaling, and (iii) in response to selecting the beam, to determine, based on a second quality of the selected beam, whether to perform Msg1 transmission with coverage enhancement or to perform the Msg1 transmission without coverage enhancement. Furthermore, the CPU 308 can execute the program code 312 to perform one, some and/or all of the above-described actions and steps and/or others described herein.

Figure 6:
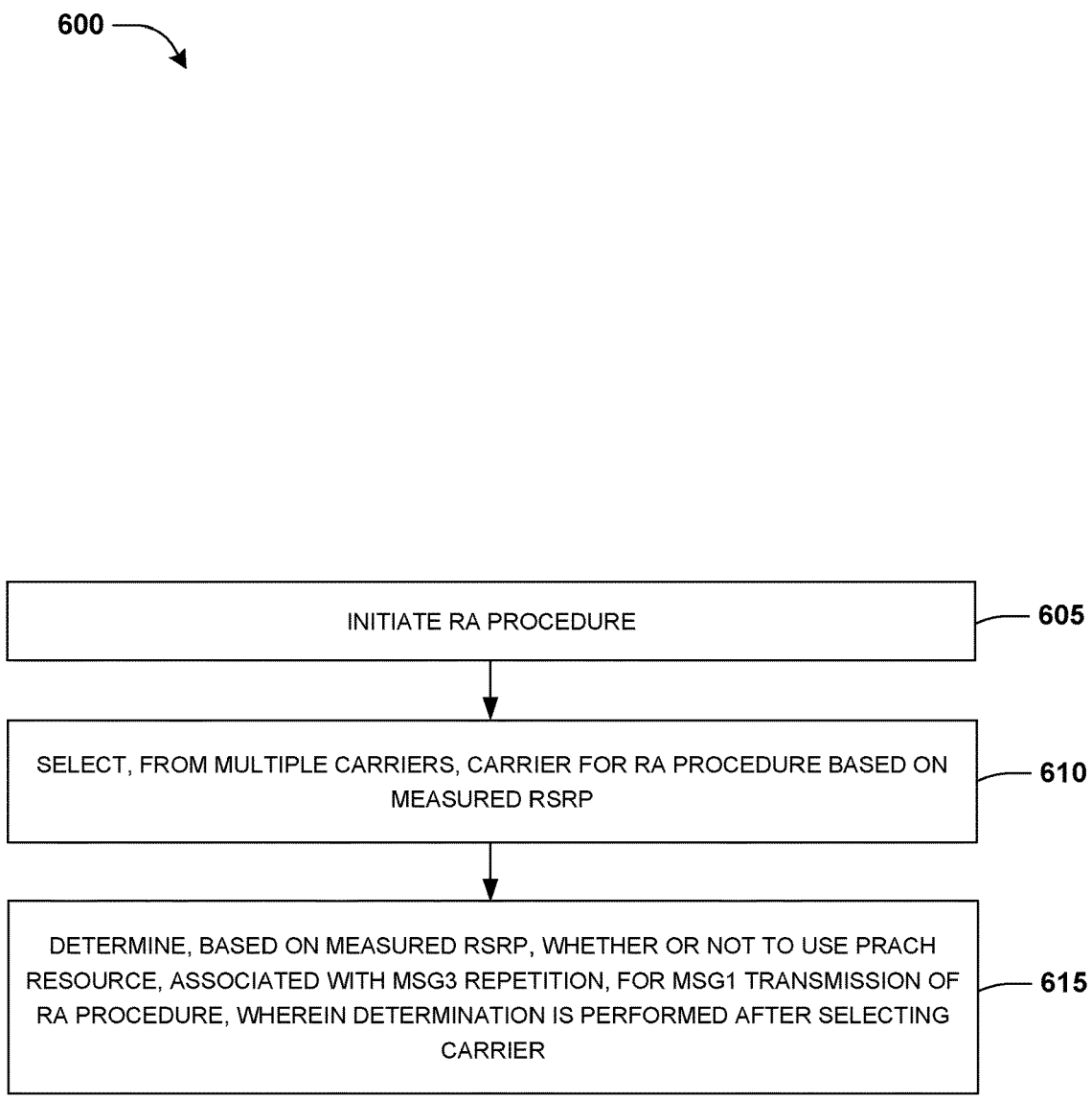
FIG. 6 is a flow chart according to one exemplary embodiment.

FIG. 6 is a flow chart 600 according to one exemplary embodiment from the perspective of a UE. In step 605, the UE initiates a RA procedure. In step 610, the UE selects, from multiple carriers, a carrier for the RA procedure based on a measured RSRP. For example, the carrier is used for performing the RA procedure (e.g., the carrier is used to perform one or more transmissions of the RA procedure). In step 615, the UE determines, based on the measured RSRP, whether or not to use a PRACH resource, associated with Msg3 repetition (e.g., corresponding to Msg3 repetition), for Msg1 transmission of the RA procedure. The determination (of whether or not to use the PRACH resource associated with Msg3 repetition) is performed after the carrier is selected.

In an example, the PRACH resource associated with Msg3 repetition may be used for (and/or configured for) performing the Msg1 transmission (with one or more Msg1 repetitions, for example). In some examples, the UE performing the Msg1 transmission using the PRACH resource may indicate that the UE will (and/or requests to) perform Msg3 transmission of the RA procedure with one or more Msg3 repetitions. For example, a network that receives the Msg1 transmission may determine, based on the Msg1 transmission being performed using the PRACH resource associated with Msg3 repetition, that the Msg3 transmission of the RA procedure will be performed with one or more Msg3 repetitions. Alternatively and/or additionally, the network may determine, based on the Msg1 transmission being performed using the PRACH resource associated with Msg3 repetition, that the UE requests to perform the Msg3 transmission of the RA procedure with one or more Msg3 repetitions.

In one embodiment, the UE initiating the RA procedure comprises reception, by the UE, of an indication (e.g., a PDCCH order) of performing the RA procedure from a network.

In one embodiment, the UE initiating the RA procedure comprises initiation of the RA procedure by a MAC entity of the UE.

In one embodiment, the UE initiating the RA procedure comprises initiation of the RA procedure by RRC (e.g., a RRC layer of the UE).

In one embodiment, the UE performs the determination in response to (e.g., upon) the initiation of the RA procedure. For example, the UE may select the carrier in response to (e.g., upon) the initiation of the RA procedure and/or the UE may perform the determination in response to (e.g., upon) the selection of the carrier.

In one embodiment, the multiple carriers comprise an NUL carrier and a SUL carrier.

In one embodiment, the UE selects the SUL carrier for the RA procedure based on the measured RSRP being less than a first threshold (e.g., the UE selects the SUL carrier for the RA procedure if the measured RSRP is less than the first threshold). The UE selects the NUL carrier for the RA procedure based on the measured RSRP not being less than the first threshold (e.g., the UE selects the NUL carrier for the RA procedure if the measured RSRP is not less than the first threshold).

In one embodiment, the measured RSRP is an RSRP of a downlink pathloss reference (e.g., the measured RSRP is with respect to the downlink pathloss reference). For example, the downlink pathloss reference may be a signal, wherein a received power level of the signal may be measured to determine the measured RSRP.

In one embodiment, the UE selects, from among 2-step RA type and 4-step RA type, an RA type (e.g., a type of RA procedure) for the RA procedure. The UE performs the determination after selecting the RA type. In an example in which the UE selects 2-step RA type, the RA procedure is performed as a 2-step RA procedure. In an example in which the UE selects 4-step RA type, the RA procedure is performed as a 4-step RA procedure.

In one embodiment, the PRACH resource associated with Msg3 repetition is separate from (e.g., different from) a second PRACH resource not associated with Msg3 repetition, wherein the PRACH resource associated with Msg3 repetition comprises one or more time-frequency domain resource locations and/or one or more RA Preamble indices (e.g., the PRACH resource associated with Msg3 repetition may be separate from each PRACH resource that is not associated with Msg3 repetition). For example, the PRACH resource associated with Msg3 repetition may not overlap with the second PRACH resource that is not associated with Msg3 repetition (e.g., the PRACH resource associated with Msg3 repetition may not overlap with any PRACH resource associated with Msg3 repetition). Alternatively and/or additionally, the one or more time-frequency domain resource locations of the PRACH resource may be separate from (e.g., may be different from and/or may not overlap with) one or more second time-frequency domain resource locations of the second PRACH resource. Alternatively and/or additionally, the one or more time-frequency domain resource locations of the PRACH resource may be separate from (e.g., may be different from and/or may not overlap with) one or more time-frequency domain resource locations of each PRACH resource that is not associated with Msg3 repetition. Alternatively and/or additionally, the one or more RA Preamble indices of the PRACH resource may be separate from (e.g., may be different from and/or may not overlap with) one or more second RA Preamble indices of the second PRACH resource. Alternatively and/or additionally, the one or more RA Preamble indices of the PRACH resource may be separate from (e.g., may be different from and/or may not overlap with) one or more RA Preamble indices of each PRACH resource that is not associated with Msg3 repetition.

In an example, the second PRACH resource that is not associated with Msg3 repetition may be used for (and/or configured for) performing the Msg1 transmission (without one or more Msg1 repetitions, for example). In some examples, the UE performing the Msg1 transmission using the second PRACH resource may indicate that the UE will (and/or requests to) perform Msg3 transmission of the RA procedure without one or more Msg3 repetitions. For example, a network that receives the Msg1 transmission may determine, based on the Msg1 transmission being performed using the second PRACH resource that is not associated with Msg3 repetition, that the Msg3 transmission of the RA procedure will be performed without one or more Msg3 repetitions. Alternatively and/or additionally, the network may determine, based on the Msg1 transmission being performed using the second PRACH resource that is not associated with Msg3 repetition, that the UE requests to perform the Msg3 transmission of the RA procedure without one or more Msg3 repetitions.

In one embodiment, the UE uses the PRACH resource associated with Msg3 repetition if the measured RSRP is less than a second threshold. For example, if the measured RSRP is less than the second threshold, the UE may perform the Msg1 transmission using the PRACH resource associated with Msg3 repetition.

In one embodiment, the UE uses a second PRACH resource not associated with Msg3 repetition if the measured RSRP is not less than the second threshold. For example, if the measured RSRP is not less than the second threshold, the UE may perform the Msg1 transmission using the second PRACH resource that is not associated with Msg3 repetition.

In one embodiment, the determination comprises determining, based on the measured RSRP being less than the second threshold, to use the PRACH resource associated with Msg3 repetition. Based on the determination to use the PRACH resource associated with Msg3 repetition, the UE performs the Msg1 transmission of the RA procedure using the PRACH resource associated with Msg3 repetition.

In one embodiment, the determination comprises determining, based on the measured RSRP not being less than the second threshold, to use the second PRACH resource not associated with Msg3 repetition. Based on the determination to use the second PRACH resource that is not associated with Msg3 repetition, the UE performs the Msg1 transmission of the RA procedure using the second PRACH resource.

In one embodiment, the determination comprises determining to use the PRACH resource associated with Msg3 repetition. Based on the determination to use the PRACH resource associated with Msg3 repetition, during the RA procedure, the UE does not use a second PRACH resource that is not associated with Msg3 repetition. For example, after performing the determination to use the PRACH resource associated with Msg3 repetition (and/or if the UE determines to use the PRACH resource associated with Msg3 repetition), the UE may not use a second PRACH resource, that is not associated with Msg3 repetition, for the Msg1 transmission of the RA procedure.

In one embodiment, the determination comprises determining to use the PRACH resource associated with Msg3 repetition. Based on the determination to use the PRACH resource associated with Msg3 repetition, during the RA procedure, the UE does not use a second PRACH resource, that is not associated with Msg3 repetition, based on a second determination of whether or not to use the PRACH resource associated with Msg3 repetition. For example, after performing the determination to use the PRACH resource associated with Msg3 repetition (and/or if the UE determines to use the PRACH resource associated with Msg3 repetition), the UE may not perform, during the RA procedure, a second determination to determine whether or not to use the PRACH resource associated with Msg3 repetition (e.g., if the UE determines to use the PRACH resource associated with Msg3 repetition, the UE may not perform any other determination of whether or not to use the PRACH resource associated with Msg3 repetition for the RA procedure).

In one embodiment, the UE receives an indication via an RAR of the RA procedure, wherein the indication is indicative of performing one or more Msg3 repetitions. The UE performs the one or more Msg3 repetitions for the RA procedure based on the indication. The RAR may comprise the indication. The UE may perform Msg3 transmission of the RA procedure with the one or more Msg3 repetitions (e.g., one or more repetitions of transmitting Msg3 of the RA procedure). In an example, the UE performs the Msg3 transmission with the one or more Msg3 repetitions in response to the indication.

In one embodiment, the UE determines whether or not to use the PRACH resource associated with Msg3 repetition for the Msg1 transmission of the RA procedure once (e.g., only once) for the RA procedure. For example, after performing the determination of whether or not to use the PRACH resource associated with Msg3 repetition for the Msg1 transmission, the UE may not perform another determination of whether or not to use the PRACH resource associated with Msg3 repetition for the Msg1 transmission (e.g., the UE performs the determination of whether or not to use the PRACH resource at most once for the RA procedure).

Referring back to FIGS. 3 and 4, in one exemplary embodiment of a UE, the device 300 includes a program code 312 stored in the memory 310. The CPU 308 may execute program code 312 to enable the UE (i) to initiate a RA procedure, (ii) to select, from multiple carriers, a carrier for the RA procedure based on a measured RSRP, and (iii) to determine, based on the measured RSRP, whether or not to use a PRACH resource, associated with Msg3 repetition, for Msg1 transmission of the RA procedure, wherein the determination is performed after selecting the carrier. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 5-6. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 5-6, and/or one, some and/or all of the above-described actions and steps and/or others described herein.

It may be appreciated that applying one or more of the techniques provided herein may result in one or more benefits including, but not limited to, increased efficiency and/or increased speed of communication between devices (e.g., a UE and/or a network node). The increased efficiency and/or increased speed may be a result of enabling, using one or more of the techniques provided herein, the UE to perform coverage-enhanced Msg1 transmission and/or coverage-enhanced Msg3 transmission in an RA procedure, such as a contention-based RA procedure. Alternatively and/or additionally, enabling the UE to perform coverage-enhanced Msg1 transmission and/or coverage-enhanced Msg3 transmission may provide for a reduced failure rate of Msg1 transmissions, a reduced failure rate of Msg3 transmissions and/or an increased success rate of RA procedures.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   initiating a Random Access (RA) procedure;
   selecting, from multiple carriers, a carrier for the RA procedure based on a measured Reference Signal Received Power (RSRP) and a first threshold;
   after selecting the carrier based on the measured RSRP and the first threshold, determining, based on the measured RSRP and a second threshold, whether or not to use an RA preamble index, associated with Message 3 (Msg3) repetition on Physical Uplink Shared Channel (PUSCH), for Message 1 (Msg1) transmission of the RA procedure;
   after determining whether or not to use the RA preamble index, receiving an indication via a Random Access Response (RAR) of the RA procedure, wherein the indication is indicative of performing one or more Msg3 repetitions on PUSCH; and
   performing the one or more Msg3 repetitions on PUSCH for the RA procedure based on the indication received via the RAR after determining whether or not to use the RA preamble index based on the measured RSRP.

2. The method of claim 1, wherein:
   the determination is performed in response to the initiating the RA procedure.

3. The method of claim 1, wherein:
   the multiple carriers comprise a normal uplink (NUL) carrier and a supplementary uplink (SUL) carrier.

4. The method of claim 3, wherein:
   the selecting the carrier comprises selecting the SUL carrier for the RA procedure based on the measured RSRP being less than the first threshold; or
   the selecting the carrier comprises selecting the NUL carrier for the RA procedure based on the measured RSRP not being less than the first threshold.

5. The method of claim 1, wherein:
   the measured RSRP is an RSRP of a downlink pathloss reference.

6. The method of claim 1, comprising:
   selecting, from among 2-step RA type and 4-step RA type, an RA type for the RA procedure, wherein the determination is performed before the selecting the RA type.

7. The method of claim 1, wherein:
   RA preamble indices associated with Msg3 repetition is separate from RA preamble indices not associated with Msg3 repetition.

8. The method of claim 1, wherein:
the determination comprises determining to use the RA preamble index associated with Msg3 repetition based on the measured RSRP being less than the second threshold, the method comprising performing the Msg1 transmission of the RA procedure, using the RA preamble index associated with Msg3 repetition, based on the determining to use the RA preamble index associated with Msg3 repetition; or
the determination comprises determining not to use the RA preamble index associated with Msg3 repetition based on the measured RSRP not being less than the second threshold, the method comprising performing the Msg1 transmission of the RA procedure, using a second RA preamble index not associated with Msg3 repetition, based on the determining not to use the RA preamble index associated with Msg3 repetition.

9. The method of claim 1, wherein:
the determination comprises determining to use the RA preamble index associated with Msg3 repetition; and
based on the determining to use the RA preamble index associated with Msg3 repetition:
during the RA procedure, the UE does not use a second RA preamble index that is not associated with Msg3 repetition.

10. The method of claim 3, wherein the NUL carrier and the SUL carrier have separate PCMAX.

11. The method of claim 1, wherein:
the UE determines whether or not to use the RA preamble index associated with Msg3 repetition for the Msg1 transmission of the RA procedure once for the RA procedure.

12. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
initiating a random access (RA) procedure;
selecting, from multiple carriers, a carrier for the RA procedure based on a measured Reference Signal Received Power (RSRP);
after selecting the carrier based on the measured RSRP, determining, based on the measured RSRP, whether or not to use an RA preamble index, associated with Message 3 (Msg3) repetition on Physical Uplink Shared Channel (PUSCH), for Message 1 (Msg1) transmission of the RA procedure;
after determining whether or not to use the RA preamble index, receiving an indication via a Random Access Response (RAR) of the RA procedure, wherein the indication is indicative of performing one or more Msg3 repetitions on PUSCH; and
performing the one or more Msg3 repetitions on PUSCH for the RA procedure based on the indication received via the RAR after determining whether or not to use the RA preamble index based on the measured RSRP.

13. The UE of claim 12, wherein:
the determination comprises determining to use the RA preamble index associated with Msg3 repetition; and
based on the determining to use the RA preamble index associated with Msg3 repetition:
during the RA procedure, the UE does not use a second RA preamble index that is not associated with Msg3 repetition.

14. The UE of claim 12, wherein:
the UE determines whether or not to use the RA preamble index associated with Msg3 repetition for the Msg1 transmission of the RA procedure once for the RA procedure.

15. The UE of claim 12, wherein:
the selecting the carrier comprises selecting a supplementary uplink (SUL) carrier for the RA procedure based on the measured RSRP being less than a first threshold; or
the selecting the carrier comprises selecting a normal uplink (NUL) carrier for the RA procedure based on the measured RSRP not being less than the first threshold.

16. The UE of claim 12, wherein:
the measured RSRP is an RSRP of a downlink pathloss reference.

17. The UE of claim 12, the operations comprising:
selecting, from among 2-step RA type and 4-step RA type, an RA type for the RA procedure, wherein the determination is performed before the selecting the RA type.

18. The UE of claim 12, wherein:
RA preamble indices associated with Msg3 repetition is separate from RA preamble indices not associated with Msg3 repetition.

19. The UE of claim 12, wherein:
the determination comprises determining to use the RA preamble index associated with Msg3 repetition based on the measured RSRP being less than a second threshold, the operations comprising performing the Msg1 transmission of the RA procedure, using the RA preamble index associated with Msg3 repetition, based on the determining to use the RA preamble index associated with Msg3 repetition; or
the determination comprises determining not to use the RA preamble index associated with Msg3 repetition based on the measured RSRP not being less than the second threshold, the operations comprising performing the Msg1 transmission of the RA procedure, using a second RA preamble index not associated with Msg3 repetition, based on the determining not to use the RA preamble index associated with Msg3 repetition.

20. A non-transitory computer-readable medium comprising processor-executable instructions that when executed by a User Equipment (UE) cause performance of operations, the operations comprising:
initiating a random access (RA) procedure;
selecting, from multiple carriers, a carrier for the RA procedure based on a measured Reference Signal Received Power (RSRP);
after selecting the carrier based on the measured RSRP, determining, based on the measured RSRP, whether or not to use an RA preamble index, associated with Message 3 (Msg3) repetition on Physical Uplink Shared Channel (PUSCH), for Message 1 (Msg1) transmission of the RA procedure;
after determining whether or not to use the RA preamble index, receiving an indication via a Random Access Response (RAR) of the RA procedure, wherein the indication is indicative of performing one or more Msg3 repetitions on PUSCH; and
performing the one or more Msg3 repetitions on PUSCH for the RA procedure based on the indication received via the RAR after determining whether or not to use the RA preamble index based on the measured RSRP.

* * * * *